US012666160B2

(12) United States Patent
Ho et al.

(10) Patent No.: US 12,666,160 B2
(45) Date of Patent: Jun. 23, 2026

(54) CAPTURING IMAGES USING VARIABLE APERTURE DEVICES

(71) Applicant: QUALCOMM Incorporated, San Diego, CA (US)

(72) Inventors: Po-Chi Ho, Taipei City (TW); Wei-Te Chang, Taipei City (TW); Lei Li, Shenzhen (CN); Yawen Chi, Taoyuan (TW); Wei-Chih Liu, Taipei City (TW); Wen-Chun Feng, New Taipei City (TW)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/729,679

(22) PCT Filed: Mar. 24, 2022

(86) PCT No.: PCT/CN2022/082700
§ 371 (c)(1),
(2) Date: Jul. 17, 2024

(87) PCT Pub. No.: WO2023/178588
PCT Pub. Date: Sep. 28, 2023

(65) Prior Publication Data
US 2025/0097589 A1 Mar. 20, 2025

(51) Int. Cl.
*H04N 23/741* (2023.01)
*H04N 23/67* (2023.01)
(Continued)

(52) U.S. Cl.
CPC .......... *H04N 23/741* (2023.01); *H04N 23/73* (2023.01); *H04N 23/76* (2023.01); *H04N 23/67* (2023.01)

(58) Field of Classification Search
CPC ...... H04N 23/741; H04N 23/73; H04N 23/76; H04N 23/67; H04N 23/45; H04N 23/633;
(Continued)

(56) References Cited

U.S. PATENT DOCUMENTS 10,200,599 B1 * 2/2019 Baldwin .............. H04N 23/745
2007/0165133 A1 7/2007 Shmizu et al.
(Continued)

FOREIGN PATENT DOCUMENTS

CN 102457682 A 5/2012
CN 105872148 A 8/2016
(Continued)

OTHER PUBLICATIONS

International Search Report and Written Opinion—PCT/CN2022/082700—ISA/EPO—Dec. 15, 2022.
(Continued)

*Primary Examiner* — Susan E. Hodges
(74) *Attorney, Agent, or Firm* — Polsinelli LLP/QUALCOMM Incorporated

(57) ABSTRACT

Disclosed are systems, apparatuses, processes, and computer-readable media for processing image data. One illustrative method of processing image data includes: capturing a first image of a subject using a variable aperture lens configured with a first aperture and a first exposure value; capturing a second image of the subject using the variable aperture lens configured with a second aperture and a second exposure value, wherein the second aperture is smaller than the first aperture and the second exposure value is smaller than the first exposure value; and generating a high dynamic range (HDR) image at least in part by fusing the first image and the second image fusing the first image and the second image.

21 Claims, 16 Drawing Sheets

(51) Int. Cl.
    *H04N 23/73*     (2023.01)
    *H04N 23/76*     (2023.01)
(58) Field of Classification Search
    CPC .... H04N 23/635; H04N 23/75; H04N 23/743;
               H04N 23/55; H04N 23/80; H04N 23/63
    USPC .......................................................... 348/36
    See application file for complete search history.

(56)                 References Cited

U.S. PATENT DOCUMENTS

| | | | |
|---|---|---|---|
| 2012/0105690 A1 | 5/2012 | Waqas et al. | |
| 2018/0160046 A1 | 6/2018 | Nash et al. | |
| 2020/0186710 A1* | 6/2020 | Sheikh | H04N 23/667 |
| 2020/0195909 A1* | 6/2020 | Shintani | G01S 7/497 |
| 2022/0279136 A1* | 9/2022 | Tanaka | G03B 7/08 |

FOREIGN PATENT DOCUMENTS

| | | | |
|---|---|---|---|
| CN | 208638453 U | 3/2019 | |
| CN | 110198417 A | 9/2019 | |
| CN | 110213502 A | 9/2019 | |
| JP | 2013026673 A | 2/2013 | |

OTHER PUBLICATIONS

Partial European Search Report EP22932653 Search Authority the Hague Nov. 26, 2025.
Supplementary European Search Report—EP22932653—Search Authority—The Hague—Mar. 5, 2026.

\* cited by examiner

F/4.0

F/2.8

F/2.0

F/1.4

900

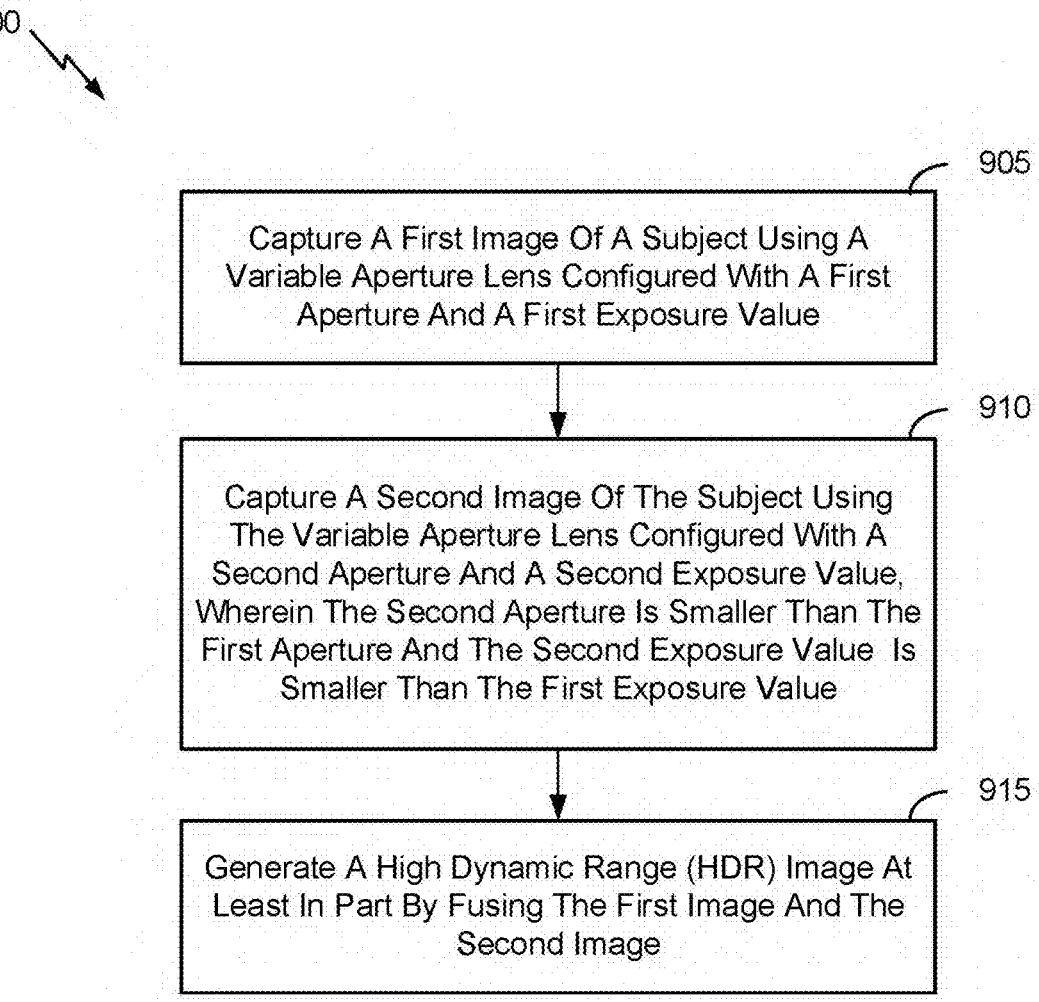

905

Capture A First Image Of A Subject Using A Variable Aperture Lens Configured With A First Aperture And A First Exposure Value

910

Capture A Second Image Of The Subject Using The Variable Aperture Lens Configured With A Second Aperture And A Second Exposure Value, Wherein The Second Aperture Is Smaller Than The First Aperture And The Second Exposure Value Is Smaller Than The First Exposure Value

915

Generate A High Dynamic Range (HDR) Image At Least In Part By Fusing The First Image And The Second Image

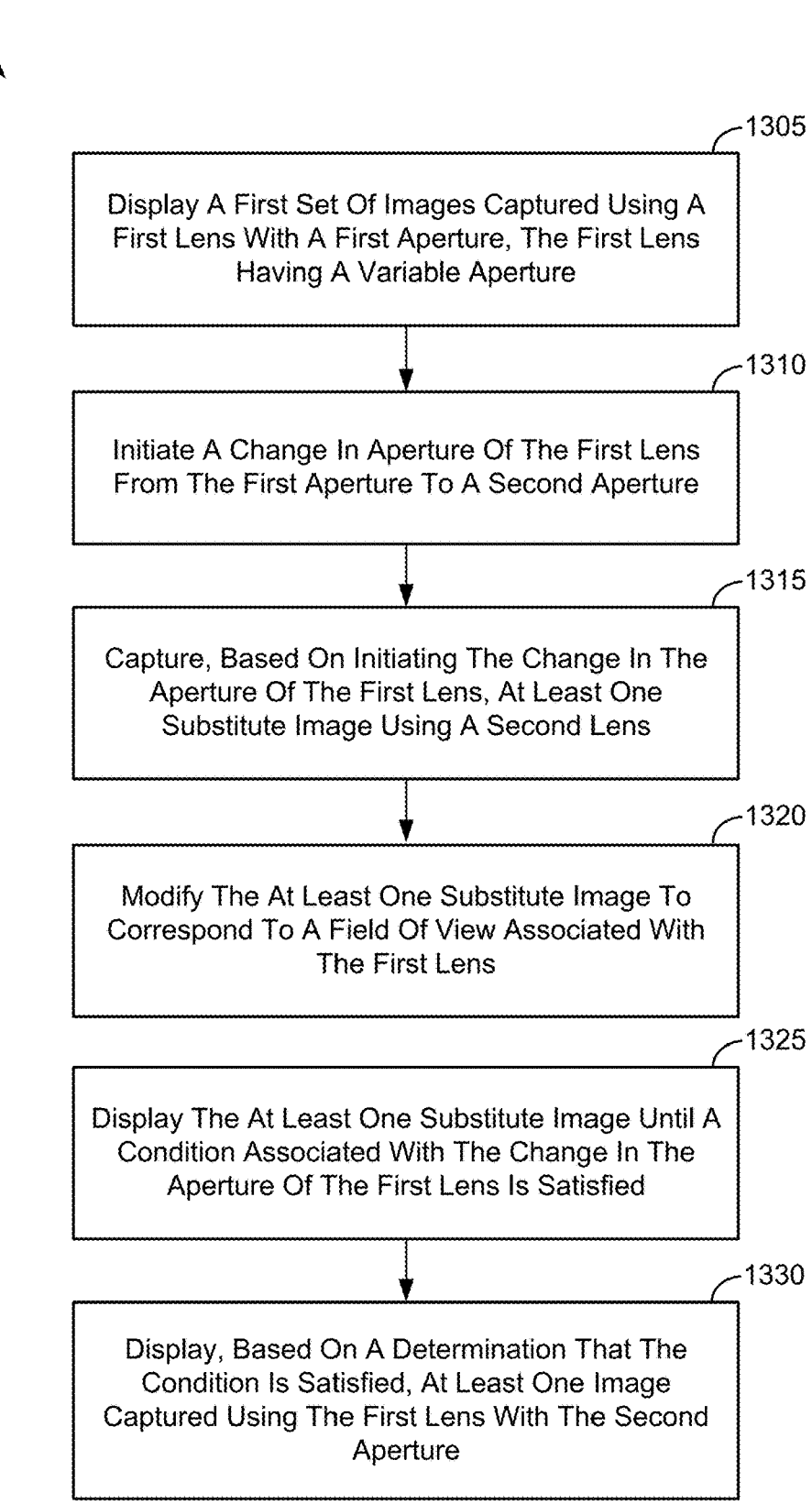

1305

Display A First Set Of Images Captured Using A First Lens With A First Aperture, The First Lens Having A Variable Aperture

1310

Initiate A Change In Aperture Of The First Lens From The First Aperture To A Second Aperture

1315

Capture, Based On Initiating The Change In The Aperture Of The First Lens, At Least One Substitute Image Using A Second Lens

1320

Modify The At Least One Substitute Image To Correspond To A Field Of View Associated With The First Lens

1325

Display The At Least One Substitute Image Until A Condition Associated With The Change In The Aperture Of The First Lens Is Satisfied

1330

Display, Based On A Determination That The Condition Is Satisfied, At Least One Image Captured Using The First Lens With The Second Aperture

FIG. 13

CAPTURING IMAGES USING VARIABLE APERTURE DEVICES

CROSS-REFERENCE TO RELATED APPLICATIONS

This application for patent is a 371 of international Patent Application PCT/CN2022/082700, filed Mar. 24, 2022, which is hereby incorporated by referenced in its entirety and for all purposes.

FIELD

The present disclosure generally relates to image processing. More specifically, the present disclosure relates to systems and techniques for capturing images using variable aperture imaging devices.

BACKGROUND

The dynamic range of a digital imaging device, such as a digital camera, is the ratio between the largest amount of light that the device can capture without light saturation, and the lowest amount of light the device can accurately measure and distinguish from intrinsic image noise (electrical noise, thermal noise, etc.). Traditionally, digital cameras are able to capture only a small portion of the natural illumination range of a real-world scene. For example, the dynamic range of a scene may be, 100,000:1, while the dynamic range of the image sensor of a digital camera may be, 100:1. When the dynamic range of the scene exceeds the dynamic range of the sensor, details in the regions of highest light levels and/or lowest light levels are lost.

SUMMARY

In some examples, systems and techniques are described for generating a high dynamic range (HDR) images based on a depth of field. Disclosed are systems, apparatuses, methods, computer readable medium, and circuits for generating an HDR image at least in part by performing automatic exposure control (AEC) on a previously captured image to determine exposure and aperture settings for one or more images. According to at least one example, a method of processing image data includes: capturing a first image of a subject using a variable aperture lens configured with a first aperture and a first exposure value; capturing a second image of the subject using the variable aperture lens configured with a second aperture and a second exposure value, wherein the second aperture is smaller than the first aperture and the second exposure value is smaller than the first exposure value; and generating an HDR image at least in part by fusing the first image and the second image.

In another example, an apparatus for processing image data is provided that includes at least one memory and at least one processor (e.g., implemented in circuitry) coupled to the at least one memory. The at least one processor is configured to: capture a first image of a subject using a variable aperture lens configured with a first aperture and a first exposure value; capture a second image of the subject using the variable aperture lens configured with a second aperture and a second exposure value, wherein the second aperture is smaller than the first aperture and the second exposure value is smaller than the first exposure value; and generate an HDR image at least in part by fusing the first image and the second image.

In another example, a non-transitory computer-readable medium is provided that has stored thereon instructions that, when executed by one or more processors, cause the one or more processors to: capture a first image of a subject using a variable aperture lens configured with a first aperture and a first exposure value; capture a second image of the subject using the variable aperture lens configured with a second aperture and a second exposure value, wherein the second aperture is smaller than the first aperture and the second exposure value is smaller than the first exposure value; and generate an HDR image at least in part by fusing the first image and the second image.

In another example, an apparatus for processing image data is provided that includes: means for capturing a first image of a subject using a variable aperture lens configured with a first aperture and a first exposure value; means for capturing a second image of the subject using the variable aperture lens configured with a second aperture and a second exposure value, wherein the second aperture is smaller than the first aperture and the second exposure value is smaller than the first exposure value; and means for generating an HDR image at least in part by fusing the first image and the second image.

In some aspects, the apparatus is, is part of, and/or includes a wearable device, an extended reality (XR) device (e.g., a virtual reality (VR) device, an augmented reality (AR) device, or a mixed reality (MR) device), a head-mounted device (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures:

FIG. 9 is a flowchart illustrating an example of a method for generating an HDR image based on depth of field and a dynamic focal ratio, in accordance with some aspects;

FIG. 13 is a flowchart illustrating an example of a method for presenting images by a device, in accordance with some aspects;

DETAILED DESCRIPTION

Figure 1:
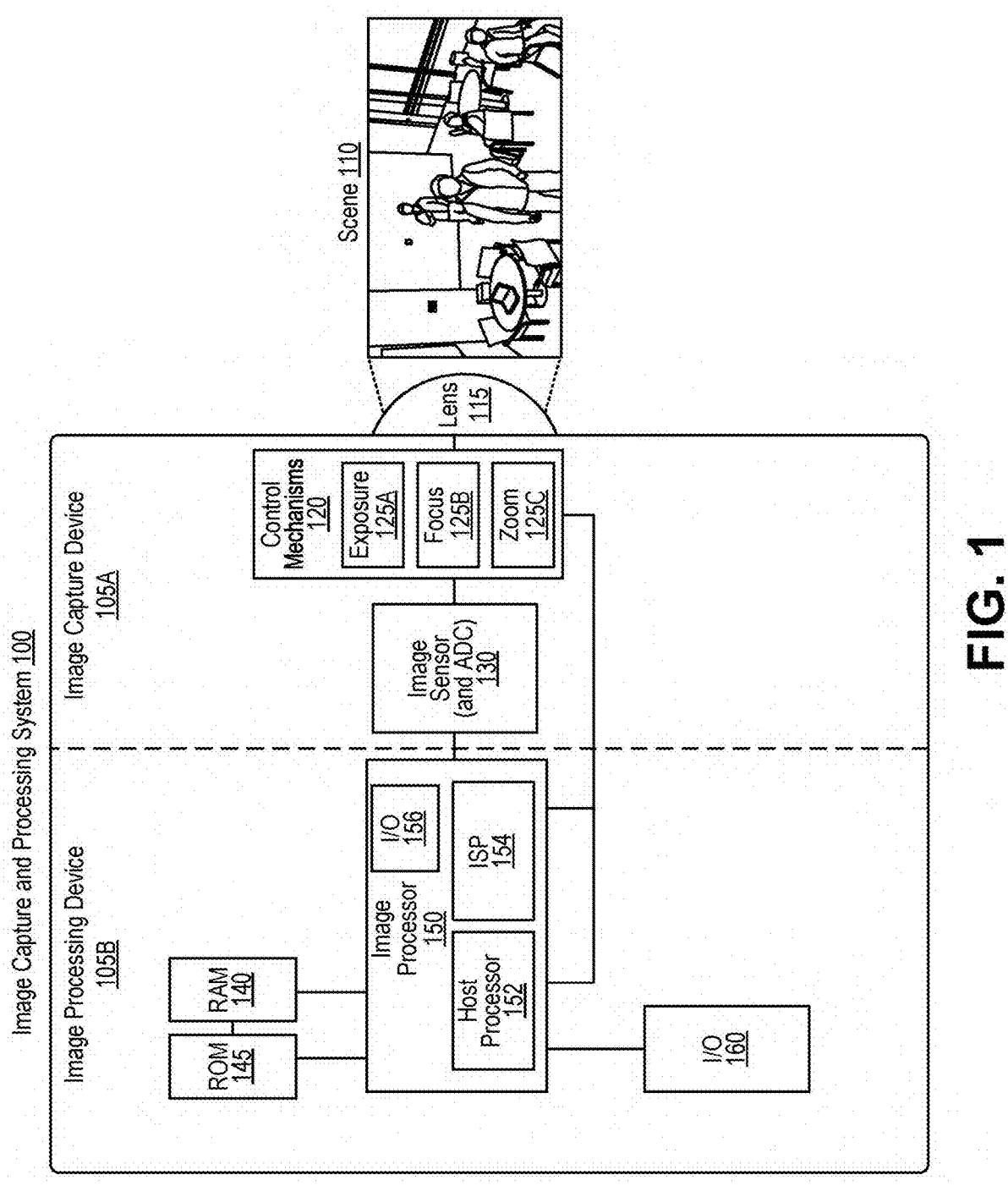
FIG. 1 is a block diagram illustrating an architecture of an image capture and processing system, in accordance with some aspects.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The ensuing description provides example aspects only, and is not intended to limit the scope, applicability, or configuration of the disclosure. Rather, the ensuing description of the exemplary aspects will provide those skilled in the art with an enabling description for implementing an aspect of the disclosure. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor (ISP)) for processing the one or more image frames captured by the image sensor.

The dynamic range of a digital imaging device, such as a digital camera, is the ratio between the largest amount of light that the device can capture without light saturation, and the lowest amount of light the device can accurately measure and distinguish from intrinsic image noise (electrical noise, thermal noise, etc.). Traditionally, digital cameras are able to capture only a small portion of the natural illumination range of a real-world scene. For example, the dynamic range of a scene may be, 100,000:1, while the dynamic range of the image sensor of a digital camera may be, 100:1. When the dynamic range of the scene exceeds the dynamic range of the sensor, details in the regions of highest light levels and/or lowest light levels are lost.

An imaging device can generate a high dynamic range (HDR) image by merging multiple images that captured with different exposure settings. For instance, an imaging device can generate an HDR image by merging together a short-exposure image captured with a short exposure time, a medium-exposure image captured with a medium exposure time that is longer than the short exposure time, and a long-exposure image captured with a long exposure time that is longer than the medium exposure time. Because short-exposure images are generally dark, they generally preserve the most detail in the highlights (bright areas) of a photographed scene. Medium-exposure images and the long-exposure images are generally brighter than short-exposure images, and may be overexposed (e.g., too bright to make out details) in the highlight portions (bright areas) of the scene. Because long-exposure images generally include bright portions, they may preserve detail in the shadows (dark areas) of a photographed scene. Medium-exposure images and the short-exposure images are generally darker than long-exposure images, and may be under-exposed (e.g., too dark to make out details in) in the shadow portions (dark areas) of the scene, making their depictions of the shadows too dark to observe details. To generate an HDR image, the imaging device may, for example, use portions of the short-exposure image to depict highlights (bright areas) of the photographed scene, use portions of the long-exposure image depicting shadows (dark areas) of the scene, and use portions of the medium-exposure image depicting other areas (other than highlights and shadows) of a scene.

In some cases, the images of the HDR image may be captured by modifying exposure times using a single focal ratio, or by using different focal ratios that only consider a focal distance to the subject. In such HDR images, the subject will be in focus based on the correct focus of the subject and will have high fidelity. The background content may be outside of the depth of field and therefore will be blurry and have a lower fidelity. The depth of field is more acutely perceivable based on subjects that are closer to an imaging device that is capturing the HDR image. Objects in HDR images that are a great distance away, such as images with a landmark, may appear blurry and therefore are not ideal for some types of photography.

In some aspects, systems, apparatuses, processes (also referred to as methods), and computer-readable media (collectively referred to herein as "systems and techniques") are described for generating an HDR image at least in part by performing automatic exposure control (AEC) on a previously captured image (e.g., a preview image) to determine exposure and aperture settings for one or more images. In some cases, an imaging system can determine a location of a subject in an image and a location of a background in the image. The imaging system can select an aperture size (or an f-number or focal ratio that defines the aperture size) using a depth of field that includes the subject and the location of the background. In some examples, the imaging system can determine different exposure times to generate different images with different dynamic ranges and combine the images to produce an HDR image with higher visual fidelity. In some cases, the imaging system can apply a different gain to various images to increase or decrease an exposure value (EV).

An imaging device may also include a display for previewing an image, which may be referred to as snapshot images. The display may be used while executing an application to, for example, capture a quick response (QR) code, capture an image of a subject (e.g., as a preview for displaying preview images), or other image-related functions. The imaging device may use a variable aperture camera with a variable aperture lens that changes based on a subject of the image. In one example, based on the subject of the image, the imaging system may cause a diaphragm to move blades that controls a size of an aperture of the variable aperture camera. Changing the aperture changes the light sensitivity of the variable aperture camera and the images captured during the aperture change process may be changed to brighten or darken the image. The diaphragm is a mechanical device and subject to external conditions that affect its movement, such as temperature and humidity, which can affect the snapshot images. In some cases, when the diaphragm is still moving and the display is presenting images to a user, snapshot images can be too dark and create a visual disruption, such as a black display, which is undesirable. In some cases, the images can also be dropped and a frame can be displayed until the camera stabilizes to produce, which also creates an undesirable visual disruption.

In some aspects, systems and techniques are described for providing a smooth transition for a variable aperture camera with a variable aperture lens. For instance, an imaging system can determine that an aperture of a variable aperture camera is changing and, while the aperture is changing, the imaging system can display an image captured by another camera. For example, the other camera may include a wide-angle lens that has a larger field of view as compared to the variable aperture camera. In some aspects, the image from the other camera is modified (e.g., cropped and aligned) to correspond to the field of view and center point associated with the image(s) from of the variable aperture camera.

The imaging system may continue to display the images from the other camera (e.g., with the wide-angle lens) until a condition is satisfied. In some aspects, the condition may include that the aperture has stopped changing (e.g., a diaphragm configured to change the aperture has stopped moving) and settled into a final position based on the aperture. Additionally or alternatively, the condition may include that the autoexposure has stabilized. In some cases, the autoexposure becomes stabilized once sufficient light has been provided to the variable aperture lens of the variable aperture camera at the current aperture so that the images from the variable aperture camera will have optical characteristics that correspond to images captured by the variable aperture camera prior to the change in aperture or have optical characteristics that correspond to images from the other camera (e.g., with the wide-angle lens). Replacing the images until the condition is satisfied prevents visual disruptions, such as brightness changes between images, to improve the user experience.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the image capture and processing system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B stores the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters of a color filter array, and may thus measure light matching the color of the color filter covering the photodiode. Various color filter arrays can be used, including a Bayer color filter array, a quad color filter array (also referred to as a quad Bayer filter), and/or other color filter array. The quad color filter array includes a 2×2 (or "quad") pattern of color filters, including a 2×2 pattern of red (R) color filters, a pair of 2×2 patterns of green (G)

color filters, and a 2×2 pattern of blue (B) color filters. The Bayer color filter array includes a repeating pattern of red color filters, blue color filters, and green color filters. Using either quad color filter array or the Bayer color filter array, each pixel of an image is generated based on red light data from at least one photodiode covered in a red color filter of the color filter array, blue light data from at least one photodiode covered in a blue color filter of the color filter array, and green light data from at least one photodiode covered in a green color filter of the color filter array. Other types of color filter arrays may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for PDAF. The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more ISPs (including ISP 154), one or more host processors (including host processor 152), and/or one or more of any other type of processor 1510 discussed with respect to the computing system 1500. The host processor 152 can be a digital signal processor (DSP) and/or other type of processor. The image processor 150 may store image frames and/or processed images in random access memory (RAM) 140/1520, read-only memory (ROM) 145/1525, a cache 1512, a memory unit 1515, another storage device 1530, or some combination thereof.

In some implementations, the image processor 150 is a single integrated circuit or chip (e.g., referred to as a system-on-chip (SoC)) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The host processor 152 of the image processor 150 can configure the image sensor 130 with parameter settings (e.g., via an external control interface such as I2C, I3C, SPI, GPIO, and/or other interface). In one illustrative example, the host processor 152 can update exposure settings used by the image sensor 130 based on internal processing results of an exposure control algorithm from past image frames. The host processor 152 can also dynamically configure the parameter settings of the internal pipelines or modules of the ISP 154 to match the settings of one or more input image frames from the image sensor 130 so that the image data is correctly processed by the ISP 154. Processing (or pipeline) blocks or modules of the ISP 154 can include modules for lens/sensor noise correction, de-mosaicing, color conversion, correction or enhancement/suppression of image attributes, denoising filters, sharpening filters, among others. For example, the processing blocks or modules of the ISP 154 can perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The settings of different modules of the ISP 154 can be configured by the host processor 152.

The image processing device 105B can include various input/output (I/O) devices 160 connected to the image processor 150. The I/O devices 160 can include a display screen, a keyboard, a keypad, a touchscreen, a trackpad, a touch-sensitive surface, a printer, any other output devices 1535, any other input devices 1545, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

As noted above, a color filter array can cover the one or more arrays of photodiodes (or other photosensitive elements) of the image sensor 130. The color filter array can include a quad color filter array in some. In certain situations, after an image is captured by the image sensor 130 (e.g., before the image is provided to and processed by the ISP 154), the image sensor 130 can perform a binning process to bin the quad color filter array pattern into a binned Bayer pattern. For instance, the quad color filter array pattern can be converted to a Bayer color filter array pattern (with reduced resolution) by applying the binning process.

The binning process can increase signal-to-noise ratio (SNR), resulting in increased sensitivity and reduced noise in the captured image. In one illustrative example, binning can be performed in low-light settings when lighting conditions are poor, which can result in a high-quality image with higher brightness characteristics and less noise.

FIGS. 2A-2D are conceptual diagrams illustrating a variable aperture lens 200 of a variable aperture camera with different apertures in accordance with some examples. In some aspects, as shown in FIG. 2A-2D, the variable aperture lens 200 includes a diaphragm 205 that has moveable blades to control an aperture 210 of the lens. The aperture 210 permits light to enter into the lens 200 and can reduce light exposure by decreasing size (e.g., radius) of the aperture 210.

The aperture 210 is related to a focal ratio of an optical system (e.g., a camera system), which is commonly referred to as a f-number, f-ratio, or f-stop. The focal ratio is generally denoted by "F/N," where N is equal to the focal length of the lens divided by the aperture size. The aperture size may also be referred to as a pupil size. For example, a focal length of 40 mm and an aperture size of 10 mm yields a focal ratio of F/4.0. The focal ratio is a dimensionless number and is a quantitative measure of lens speed.

The focal ratio is related to a depth of field. The depth of field is the range that objects are in focus from a focal point based on a distance to that focal point. A larger focal ratio has a larger depth of field and will have a larger range for objects to be in focus, and a smaller focal ratio has a smaller depth of field with a smaller range for objects to be in focus. Examples a scene with different focal ratios and different depths of fields are illustrated in FIGS. 3A-3D, and a graph illustrating the depth of field of different focal ratios based on distance to the focal point is illustrated in FIG. 4.

Figure 2A:
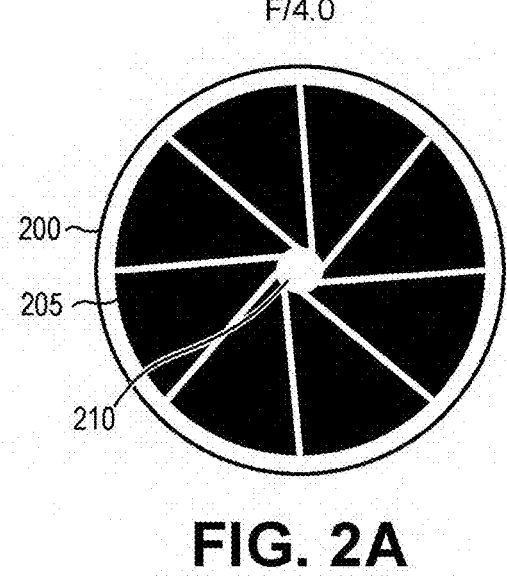
FIGS. 2A-2D are conceptual diagrams illustrating a variable aperture lens with different apertures, in accordance with some examples.
Figure 2B:
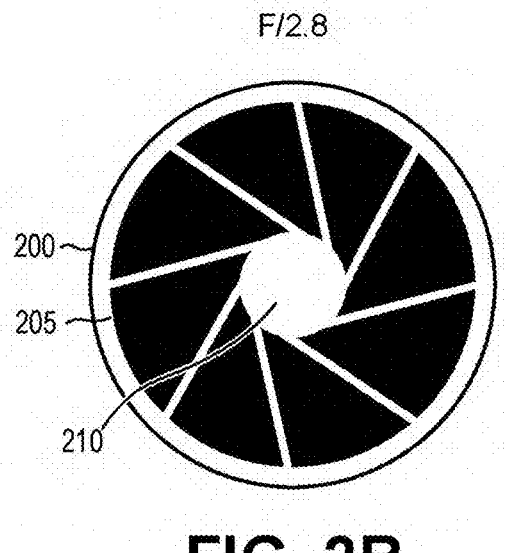
Figure 2C:
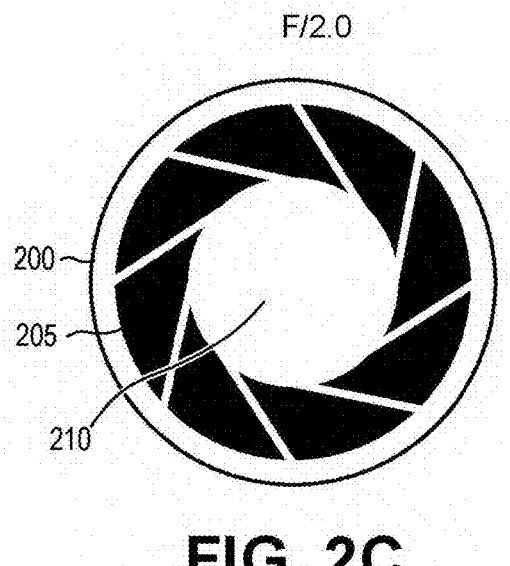
Figure 2D:
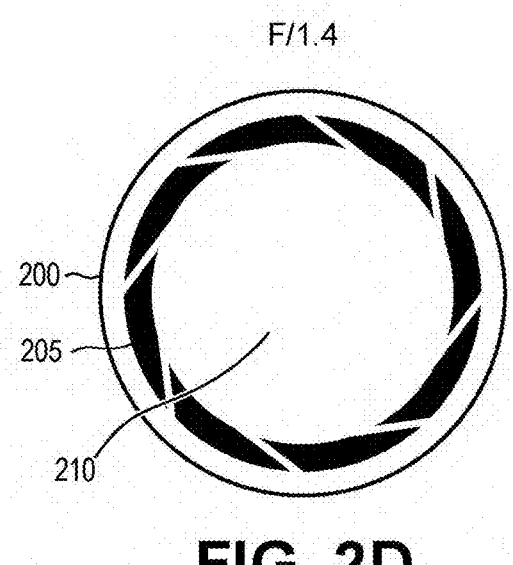

According to illustrative examples, FIG. 2A illustrates the variable aperture lens 200 configured with a focal ratio of F/4.0, FIG. 2B illustrates the variable aperture lens 200 configured with a focal ratio of F/2.8, FIG. 2C illustrates the variable aperture lens 200 configured with a focal ratio of F/2.0, and FIG. 2D illustrates the variable aperture lens 200 configured with a focal ratio of F/1.4. FIGS. 2A-2D, and any further illustrations of apertures herein, are not to scale and are provided for illustrative purposes only.

In some aspects, the aperture 210 of the variable aperture lens also affects exposure based on limiting the amount of light. For example, as illustrated in FIG. 2A and FIG. 2D, a focal ratio of F/4.0 has a much smaller aperture than a focal ratio of F/1.4 and reduces the exposure of light. A lower F-number indicates that more light is received and image quality increases, and a higher F-number indicates less light is received but the depth of field increases.

Figure 3A:
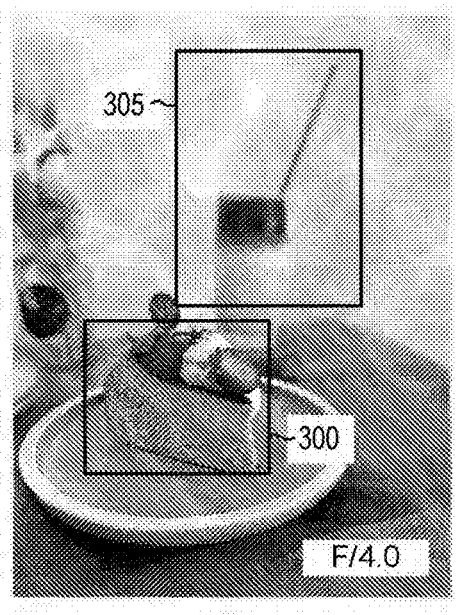
FIGS. 3A-3D illustrates a scene that is captured by a camera with a variable aperture lens using different focal ratios by controlling a size of the aperture, in accordance with some aspects.
Figure 3B:
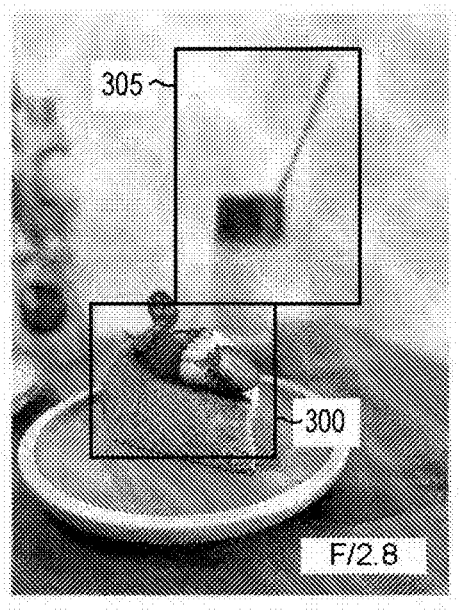
Figure 3C:
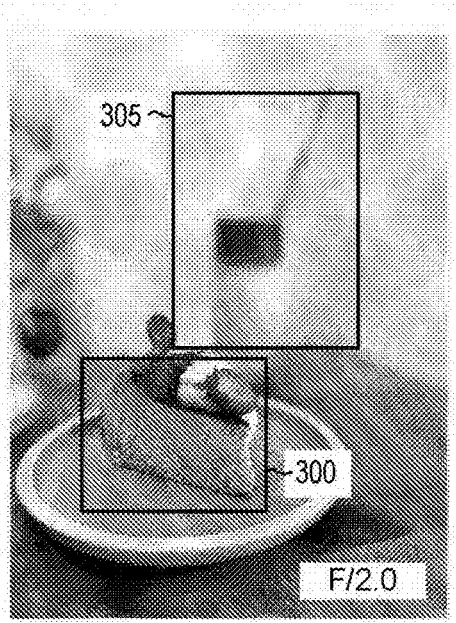
Figure 3D:
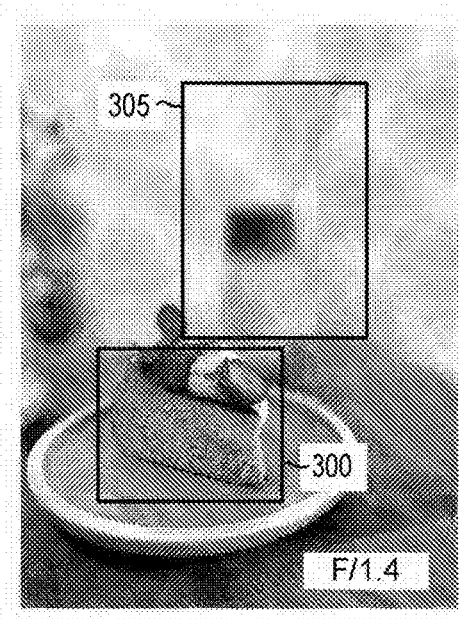
Figure 4:
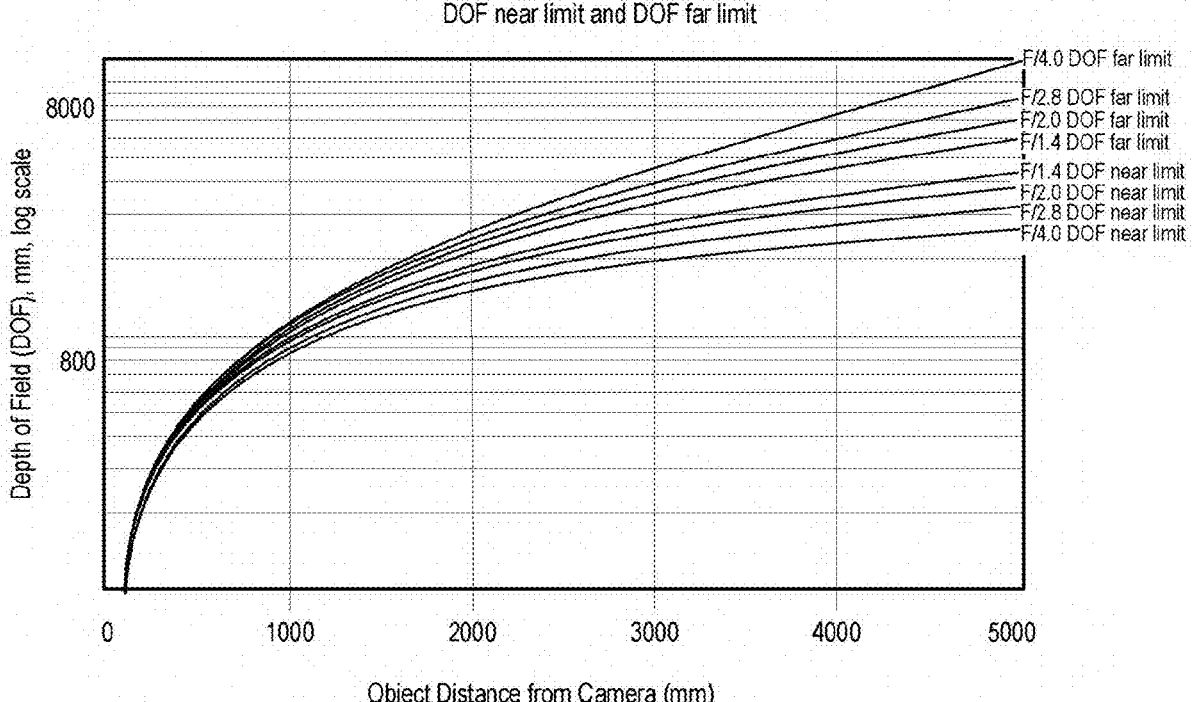
FIG. 4 is a graph that illustrates depth of field of different focal ratios based on focal distance from an optical system, in accordance with some aspects.

FIGS. 3A-3D are images of a scene that are captured by a camera with a variable aperture lens using different focal ratios by controlling a size of the aperture, in accordance with some aspects. The image of FIG. 3A illustrates a scene captured with a focal ratio of F/4.0, corresponding to the variable aperture lens 200 illustrated in FIG. 2A. The image of FIG. 3B illustrates the same scene illustrated in FIG. 3A, but captured with a focal ratio of F/2.8 and corresponding to the variable aperture lens 200 illustrated in FIG. 2B. The image of FIG. 3C illustrates the same scene illustrated in FIG. 3A captured with a focal ratio of F/2.0 and corresponding to the variable aperture lens 200 illustrated in FIG. 2C. The image of FIG. 3D illustrates the same scene illustrated in FIG. 3A captured with a focal ratio of F/1.4 and corresponding to the variable aperture lens 200 illustrated in FIG. 2D.

As noted above, the depth of field is related to the focal ratio or f-stop. FIGS. 3A, 3B, 3C, and 3D each include a foreground content 300 that corresponds to a focal point of the lens and a background content 305 that becomes blurrier as the focal ratio and the depth of field also decreases. In particular, the background content 305 illustrated in FIGS. 3A, 3B, 3C, and 3D is a beverage with a straw and the visual fidelity of the straw decreases as the focal ratio decreases. However, the foreground content 300 is similar in each captured image illustrated in FIGS. 3A, 3B, 3C, and 3D and does not perceivably vary to a naked human eye.

In some aspects, the quality of the background content 305 can be quantified with respect to sharpness/detail, which can be compared to the sharpness/detail of the foreground content as illustrated in Table 1 below. The sharpness can be calculated using a differential of horizontal blocks of pixels (diff_x) and a differential of vertical blocks of pixels. In one illustrative example, sharpness can be calculated as sharpness=$\Sigma$(abs(diff_x)+abs(diff_y)/ (block_size*block_size*2). A higher sharpness value indicates increased sharpness and detail.

TABLE 1

| Aperture | Sharpness of Foreground (content 300) | Sharpness of Background (content 305) |
|---|---|---|
| F1.4 | 10 | 1 |
| F2.0 | 10 | 2 |
| F2.8 | 10 | 4 |
| F4.0 | 10 | 8 |

FIG. 4 is a graph that illustrates depth of field (DOF) of different focal ratios based on focal distance from an optical system, in accordance with some aspects. In particular, FIG. 4 illustrates a near limit and a far limit of each focal ratio, which corresponds to the depth of field. As illustrated in FIG. 4, the depth of field at a focal distance of 1 meter varies from is 1020 mm to 875 mm for different focal ratios. At a focal distance of 4 meters, the depth of field varies from 8000 mm to 1175 mm.

Figure 5:
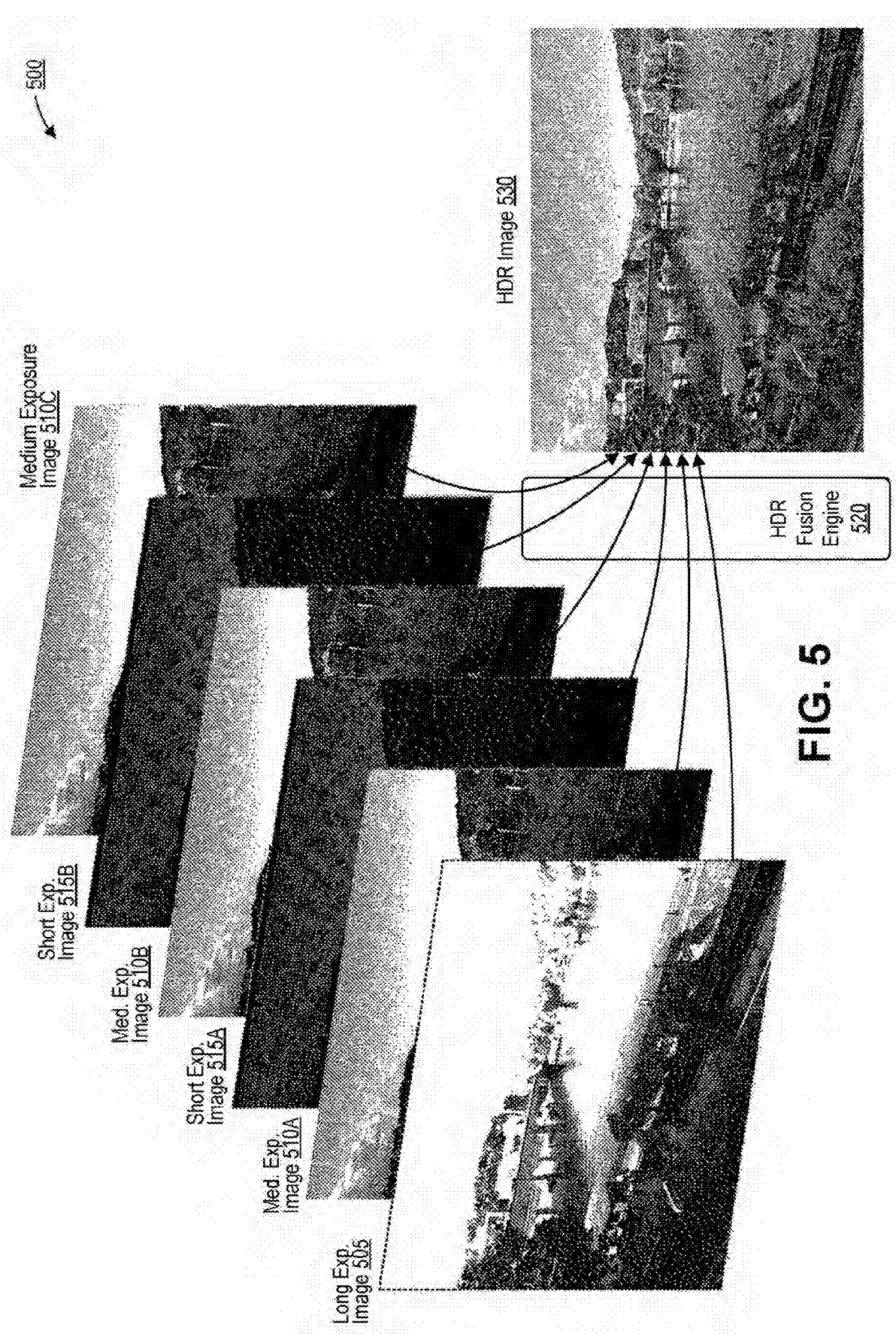
FIG. 5 is a conceptual diagram illustrating multiple images of a scene having different exposures being merged into a high dynamic range (HDR) image of the scene, in accordance with some aspects.

FIG. 5 is a conceptual diagram 500 illustrating multiple images of a scene captured using different exposures being merged into a high dynamic range (HDR) image 530 of the scene. The scene depicted in the images shown in FIG. 5 includes a body of water between a nearby landmass and a faraway landmass. A bridge is depicted on the left side of the images, connecting the nearby landmass to the faraway landmass. Both the nearby landmass and the faraway landmass include buildings and trees.

The HDR image 530 is generated using an HDR fusion engine 520 based on a long exposure image 505 of the scene, a first medium exposure image 510A of the scene, a first short exposure image 515A of the scene, a second medium exposure image 510B of the scene, a second short exposure image 515B of the scene, and a third medium exposure image 510C of the scene. The long exposure image 505 is captured by an image sensor according to a long exposure time. The medium exposure images 510A-510C are captured by one or more image sensors according to a medium exposure time that is shorter than the long exposure time. The short exposure images 515A-515B are captured by one or more image sensors according to a short exposure time that is shorter than the medium exposure time and the long exposure time. In one illustrative example, the exposures of short exposure frames can vary in a range of [0.01, 0.08] seconds, the exposures of medium exposure frames can vary in a range of [0.08, 0.33] seconds, and the exposures of long exposure frames can vary in a range of [0.33, 1] seconds.

In some examples, each of the images 505, 510A, 515A, 510B, 515B, and 510C is captured by the same image sensor. For instance, the image sensor can capture some of the images one after another. In some cases, the image sensors can be configured so that different photodiodes are read out and/or reset at different times, allowing different photodiodes to capture image data for different images (e.g., according to different exposures in some instances). In some examples, some of the images are captured by different image sensors, for example by image sensors that are adjacent to one another. Examples of the image sensor(s) that capture the images of FIG. 5 can include the image sensor 130 of FIG. 1.

As is visible from the multiple images illustrated in FIG. 5, the multiple images can include more than one image captured according to each exposure time, as in the medium exposure images 510A-510C and the short exposure images 515A-515B. In some examples, the multiple images can include more than one long-exposure image.

The long exposure image 505 is more exposed than the medium exposure images 510A-510C and the short exposure images 515A-515B. The long exposure image 505 is thus generally brighter than the medium exposure images 510A-510C and the short exposure images 515A-515B. Because the long exposure image 505 is generally bright, it preserves more detail in the shadows (dark areas) of the scene, such as much of the nearby landmass in the scene. The medium exposure images 510A-510B and the short exposure images 515A-515C are generally darker than long exposure image 505, and thus may be underexposed (e.g., too dark to make out details in) in the shadows (dark areas) of the scene, making their depictions of the shadows of the scene too dark to see details in. For instance, in the short exposure images 515A-515B, most of the nearby landmass appears so dark as to appear black, with little or no discernable details. The nearby landmass even appears considerably darker and less detailed in the medium exposure images 510A-510C than in the long exposure image 505.

The short exposure images 515A-515B are less exposed than the medium exposure images 510A-510C and the long exposure image 505. The short exposure images 515A-515B are thus generally darker than the medium exposure images 510A-510C and the long exposure image 505. Because the short exposure images 515A-515B are generally dark, they preserve the most detail in the highlights (bright areas) of the scene, such as parts of the sky and lights along the edge of the faraway landmass in the scene. The medium exposure images 510A-510B and the long exposure image 505 are generally brighter than short exposure images 515A-515B, and thus may be overexposed (e.g., too bright to make out details in) in the highlights (bright areas) of the scene, making their depictions of the highlights of the scene too bright to see details in. For instance, in the long exposure image 505, much of the sky and parts of the water appear too bright as to appear white, with little or no discernable details. Parts of the sky and parts of the water appear even appears considerably brighter and less detailed in the medium exposure images 510A-510C than in the short exposure images 515A-515B.

The medium exposure images 510A-510C are less exposed than the long exposure image 505 but more exposed than the short exposure images 515A-515B. Many of the parts of the scene that are neither highlights nor shadows appear detailed in the medium exposure images 510A-510C. Despite this, the medium exposure images 510A-510C suffer from both overexposure in some areas (e.g., some of the highlights of the scene) and underexposure in other areas (e.g., some of the shadows of the scene).

In some examples, shorter exposure images (such as the short exposure images 515A-515B) can provide higher dynamic range than longer exposure images (such as the long exposure image 505). In some examples, shorter exposure images (such as the short exposure images 515A-515B) can include more noise than longer exposure images (such as the long exposure image 505). In some examples, longer exposure images (such as the long exposure image 505) can provide lower dynamic range than shorter exposure images (such as the short exposure images 515A-515B). In some examples, longer exposure images (such as the long exposure image 505) can include less noise than shorter exposure images (such as the short exposure images 515A-515B). Thus, it may be useful to perform noise reduction for shorter exposure images, for example by capturing multiple shorter exposure images and averaging pixel values between the shorter exposure images.

The HDR image 530 is generated by the HDR fusion engine 520 by merging at least a subset of the long exposure image 505 of the scene, the first medium exposure image 510A of the scene, the first short exposure image 515A of the scene, the second medium exposure image 510B of the scene, the second short exposure image 515B of the scene, and the third medium exposure image 510C of the scene. The HDR fusion engine 520 can preserve details in the HDR image 530's depiction of the highlights of the scene by drawing primarily from the short exposure images 515A-515B and/or the medium exposure images 510A-510C to generate the HDR image 530's depiction of the highlights of the scene. The HDR fusion engine 520 can preserve details in the HDR image 530's depiction of the shadows of the scene by drawing primarily from the long exposure image 505 and/or the medium exposure images 510A-510C to generate the HDR image 530's depiction of the shadows of the scene. The HDR fusion engine 520 can preserve details in the HDR image 530's depiction of the regions of the scene that are neither highlights nor shadows by drawing primarily from the medium exposure images 510A-510C to generate the HDR image 530's depiction of the regions of the scene that are neither highlights nor shadows. The HDR fusion engine 520 can select which of the images it draws from using HDR fusion maps.

Figure 6:
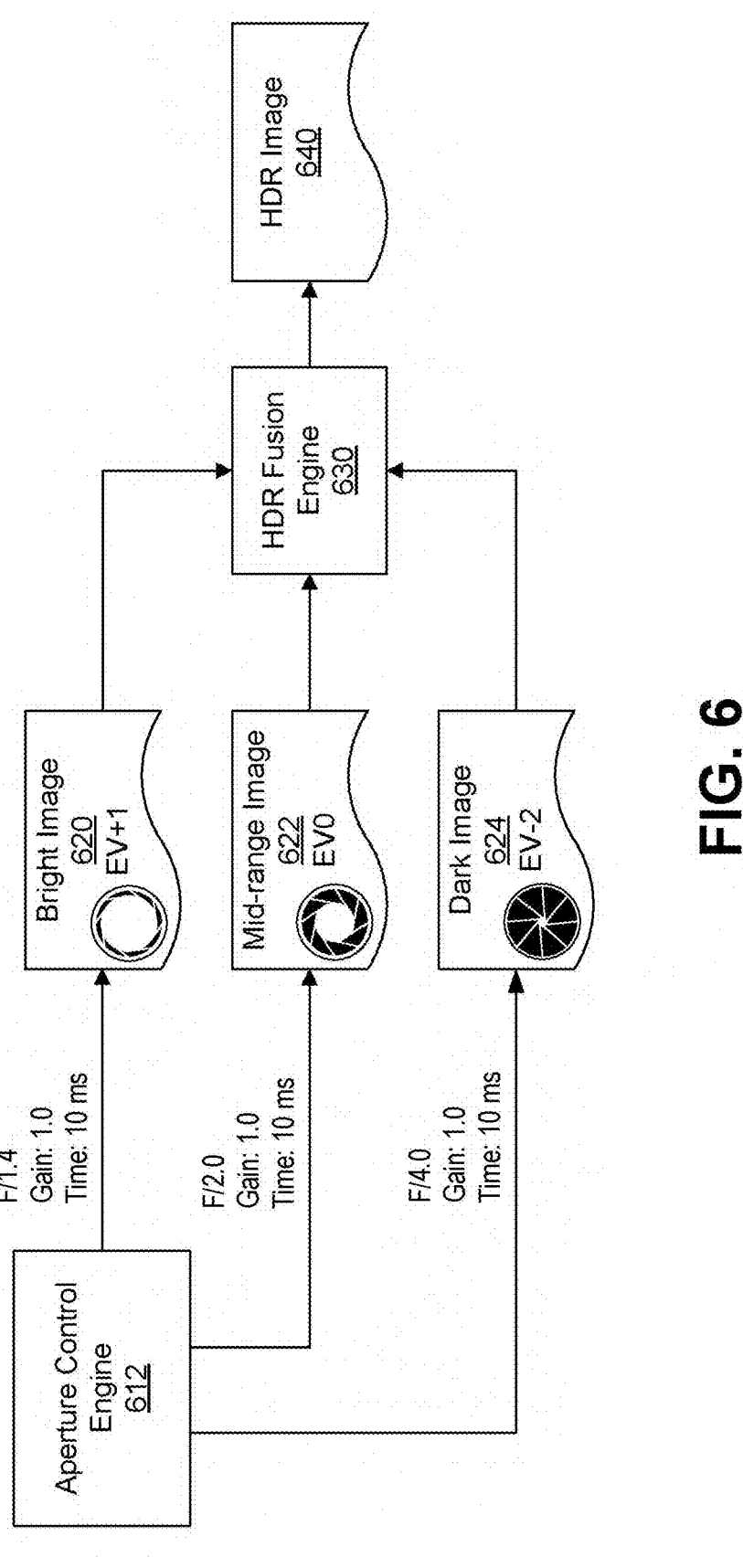
FIG. 6 illustrates an HDR module for fusing images of a subject with different apertures to create an HDR image, in accordance with some aspects.

FIG. 6 illustrates an HDR engine 600 for fusing images of a subject with different apertures to create an HDR image, in accordance with some aspects. The HDR engine 600 is configured to control the focal ratio of the lens based on the aperture size to control the exposure of the images to create a HDR image.

The HDR engine 600 is configured to control an aperture control engine 612 to generate at least two images that have different optical characteristics. For example, the aperture control engine 612 is configured to change the aperture (and corresponding focal ratio) of a variable aperture lens of an imaging device (e.g., a variable aperture camera) when capturing images. According to one illustrative example, the HDR engine 600 controls the aperture control engine 612 to adjust the aperture so that a bright image 620 having an exposure value of EV+1, a mid-range image 622 having an exposure value of EV0, and a dark image 624 having an exposure value of EV−2 are captured. In some aspects, the aperture control engine 612 configures a diaphragm (e.g., diaphragm 205) to capture the bright image 620 with a focal ratio of F/1.4 for an exposure time of 10 ms. After the bright image 620 is generated, the aperture control engine 612 configures the diaphragm to capture the mid-range image 622 with a focal ratio of F/2.0 for an exposure time of 10 ms. Finally, the aperture control engine 612 configures the diaphragm to capture the dark image 624 with a focal ratio of F/4.0 for an exposure time of 10 ms.

The HDR fusion engine 630 receives the bright image 620, the mid-range image 622, and the dark image 624 and synthesizes an HDR image 640. In this case, the focal ratios and exposure times are fixed and do not vary to ensure that the bright image 620, the mid-range image 622, and the dark image 624 each provide a suitable dynamic range for creating the HDR image, as described above with reference to FIG. 5. In some cases, the HDR image 640 may have a blurry background (e.g., with a low SNR value) because the selected aperture values (e.g., focal ratios) are unrelated to the objects in the captured scene. In some aspects, the subject of the resulting HDR image 640 will be in focus and the background content will not be within the depth of field for the fixed apertures. As a result of the background content not being within the depth of field, the background content will be blurry and have a lower SNR as compared to the foreground content. An example of the resulting HDR image 640 illustrated is described herein and illustrated in FIG. 8D.

Figure 7:
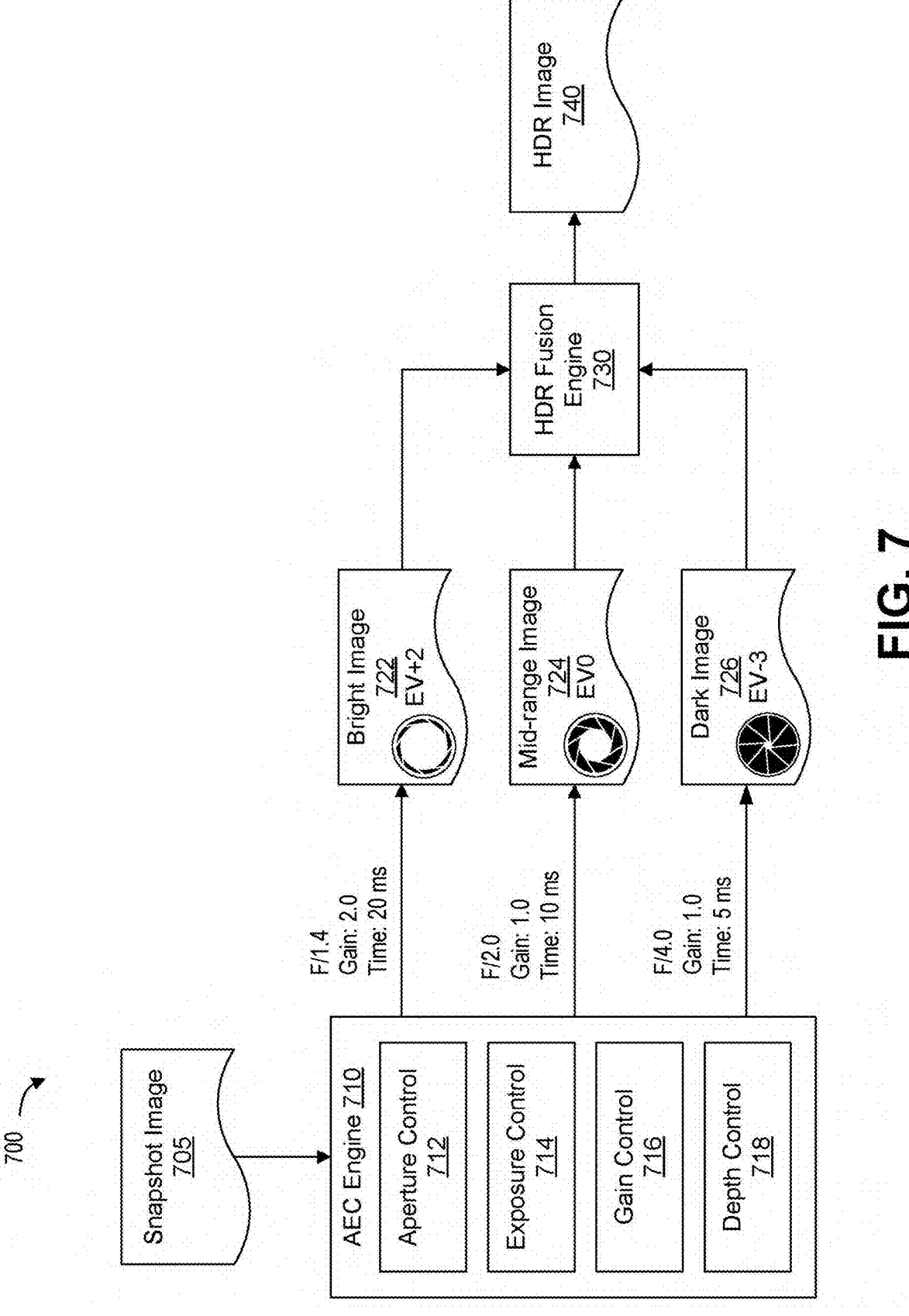
FIG. 7 illustrates an HDR module for fusing images of a subject with different apertures based on a depth of field to create an HDR image, in accordance with some aspects.

FIG. 7 illustrates an HDR engine 700 for fusing images of a subject with different apertures based on a depth of field to create an HDR image, in accordance with some aspects. The HDR engine 700 uses an image 705 (e.g., an image in a display) as a basis for controlling the HDR engine 700 to capture an HDR image using on a depth of field from the image 705. In some aspects, the image 705 may be an image that can be analyzed by the AEC engine 710. For instance, the AEC engine 710 may extract relevant characteristics or statistics of the image 705. In some aspects, the characteristics of the image 705 may be identified by an ISP, such a focal distance to a subject and a distance to background content within the snapshot image 705. In some cases, the AEC engine 710 can create a depth map. A subject may be identified from foreground pixels in the depth map and the background may be identified based on background pixels in the depth map.

The AEC engine 710 includes an aperture control 712, an exposure control 714, a gain control 716, and a depth control 718. The aperture control 712, exposure control 714, gain control 716, and depth control 718 can be applied to a previously-captured image (e.g., a preview image) in order to determine parameters for capturing one or more images at a future point in time, such as exposure and aperture for the one or more images. In some aspects, the depth control 718 is configured to identify various parameters for capturing one or more images, such as focal ratio, an exposure time associated with the focal ratio, and a gain to be applied to each image. For example, the depth control 718 can determine a depth of field based on the subject in the snapshot image 705 and the background content of the snapshot content. The depth control 718 may identify a focal ratio for a particular image and an exposure time based on that focal ratio. The depth control 718 can then select characteristics of the various images by controlling the focal ratio using the aperture control 712, controlling the exposure time of the various images using the exposure control 714, and/or controlling a gain of the images using the gain control 716. The sensitivity of the image sensor is affected based on the focal ratio and the dynamic range is limited by hardware characteristics of the aperture. For example, the sensitivity difference between F/2.0 and F/1.4 is a factor of two and the dynamic range is between 0EV (corresponding to an exposure value (EV) of 0) and 1EV (corresponding to an EV of 1). An image captured using a focal ratio of F/2.0 would have larger dynamic range than an image captured using a focal ratio of F/1.4. By controlling the exposure time, the range of the EV can be controlled. Table 2 below illustrates a table that identifies how changing focal ratios and exposure times can ensure that the EV range is consistent with different focal ratios. In some aspects, the AEC engine 710 may include a lookup table to determine the corresponding parameters for each image to ensure that each image has different optical characteristics suitable for the HDR image.

TABLE 2

| Fusion Combination | Focal Ratio | Exposure Time | Gain | EV Range |
|---|---|---|---|---|
| Example 1 | F/2.0 | 10 ms | 1× | 0 EV to 1 EV |
| | F/1.4 | 10 ms | 1× | |
| Example 2 | F/2.0 | 5 ms | 1× | 0 EV to 2 EV |
| | F/1.4 | 10 ms | 1× | |
| Example 3 | F/2.0 | 10 ms | 1× | 0 EV to 2 EV |
| | F/1.4 | 10 ms | 2× | |

In the example illustrated in FIG. 7, the HDR engine 700 captures a bright image 722 using a focal ratio of F/1.4 with a gain of 2, and an exposure time of 20 ms. The HDR engine 700 captures a mid-range image 724 with focal ratio of F/2.0, a gain of 1, and an exposure time of 10 ms. The HDR engine 700 captures the dark image 726 with a focal ratio of F/4.0, a gain of 1.0, and an exposure time of 5 ms. In this example, the bright image 722 has an exposure value of EV+2, the mid-range image 724 has an exposure value of EV0, and the dark image 726 has an exposure value of EV−3. The HDR engine 700 can capture the bright image 722, the mid-range image 724, and the dark image 726 based on the parameters determined by processing the previously-captured image (e.g., the preview image) using the aperture control 712, exposure control 714, gain control 716, and depth control 718.

The HDR fusion engine 730 receives the bright image 722, the mid-range image 724, and the dark image 726 and synthesizes an HDR image 740, such as using the technique described above with respect to FIG. 5. In some aspects, the HDR engine 700 captures the images to include the background content within the depth of field to improve the quality of the HDR image. Although the HDR engine 700 is described to use three different images, the HDR engine 700 requires at least two images to increase the dynamic range and more images can be used to further increase the quality of the HDR image 740.

Figure 8A:
FIGS. 8A and 8B illustrates images captured by an HDR module with different dynamic ranges, in accordance with some aspects.
Figure 8B:
Figure 8C:
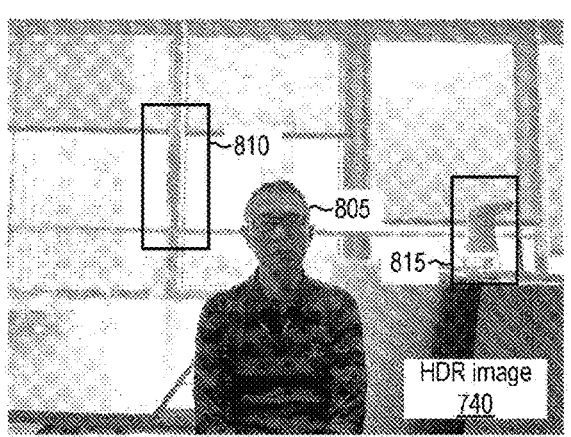
FIG. 8C illustrates an image captured by an HDR module using a variable focal ratio to improve quality of an HDR image, in accordance with some aspects.

Illustrative examples of various images captured by an HDR engine 700 are shown in FIGS. 8A, 8B, and 8C. FIG. 8A illustrates the mid-range image 724 captured with an exposure value of EV0, and FIG. 8B illustrates the dark image 726 captured with an exposure value of EV−2. FIG. 8C illustrates the HDR image 740 that is synthesized from the mid-range image 724 and the dark image 726. As illustrated in FIG. 8C, the HDR image 740 includes a subject 805 that corresponds to the focal distance and background content behind the subject 805. The background content, such as the window frame 810 and the object 815, are both within focus because of the selected depth of field.

Figure 8D:
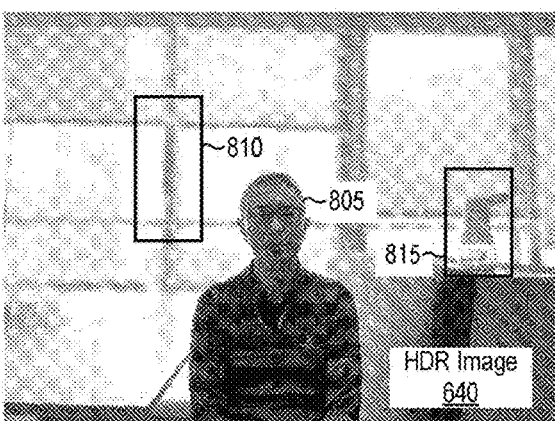
FIG. 8D illustrates an image captured by an HDR module using a fixed focal ratio.

FIG. 8D illustrates an HDR image 640 captured by the HDR engine 600, which uses fixed focal ratios. In this illustrated example, the subject 805 is within focus and has a depth of field that causes background content to be out of focus. For example, the window frame 810 is blurred because of the depth of field associated with the focal ratio used the capture the HDR image 640. The object 815 is less out of focus than the window frame 810 because the object 815 is closer to the subject 805.

FIG. 9 is a flowchart illustrating an example of a method 900 for generating an HDR image based on depth of field in accordance with some aspects. The method 900 can be performed by a computing device having an image sensor, such as a mobile wireless communication device, a camera, an extended reality (XR) device, a wireless-enabled vehicle, or other computing device. In one illustrative example, an ISP such as the ISP 1400 or a computing system 1500 can be configured to perform all or part of the method 900.

At block 905, the computing device is configured to capture a first image of a subject using a variable aperture lens with a first aperture and a first exposure value. The computing device may determine the first aperture for the first image at least in part by applying AEC to a previously captured image. For example, a previously captured image may be used to determine parameters for the generating an HDR using multiple images. Example parameters include a focal ratio, an exposure time, and gain. In some aspects, the AEC is used to determine at least one of the first aperture for the first image based on a depth of field associated with a position of the subject in the previously captured image and a position of background content in the previously captured image.

Based on the depth of field, the computing device may also determine at least one of the first exposure value for the first image at least in part by applying AEC to a previously-captured image. The AEC is used to determine at least one of the first exposure value for the first image based on an exposure value of the previously-captured image. The computing device may also modify values of pixels in the first image using a gain, which increases the first exposure value of the first image.

At block 910, the computing device is configured to capture a second image of the subject using the variable aperture lens configured with a second aperture and a second exposure value. The second aperture may be smaller than the first aperture and the second exposure value is smaller than the first exposure value. The second aperture for the second image can be determined based on the previously captured image. For example, the computing device can determine a focal ratio for the second image, an exposure time for the second image, and a gain to be applied to the second image. The first image and the second image may be configured to have different dynamic ranges that are mutually beneficial to create an HDR image as described above.

At block 915, the computing device may generate an HDR image at least in part by fusing the first image and the second image. Although two images are described, the computing device can be configured to generate more than two images to create the HDR image. For example, the first image can represent the highlights and has an exposure value of EV2, and the second image can represent the shadows and dark regions of the HDR image and has an exposure value of EV−3. The computing device can be configured to capture a third image using a third aperture and the third aperture is smaller than the first aperture and greater than the second aperture. The third image may be a mid-range exposure image having an exposure value of EV0. In this case, the HDR image generated from the first image, the second image, and the third image will have larger dynamic range.

Figure 10A:
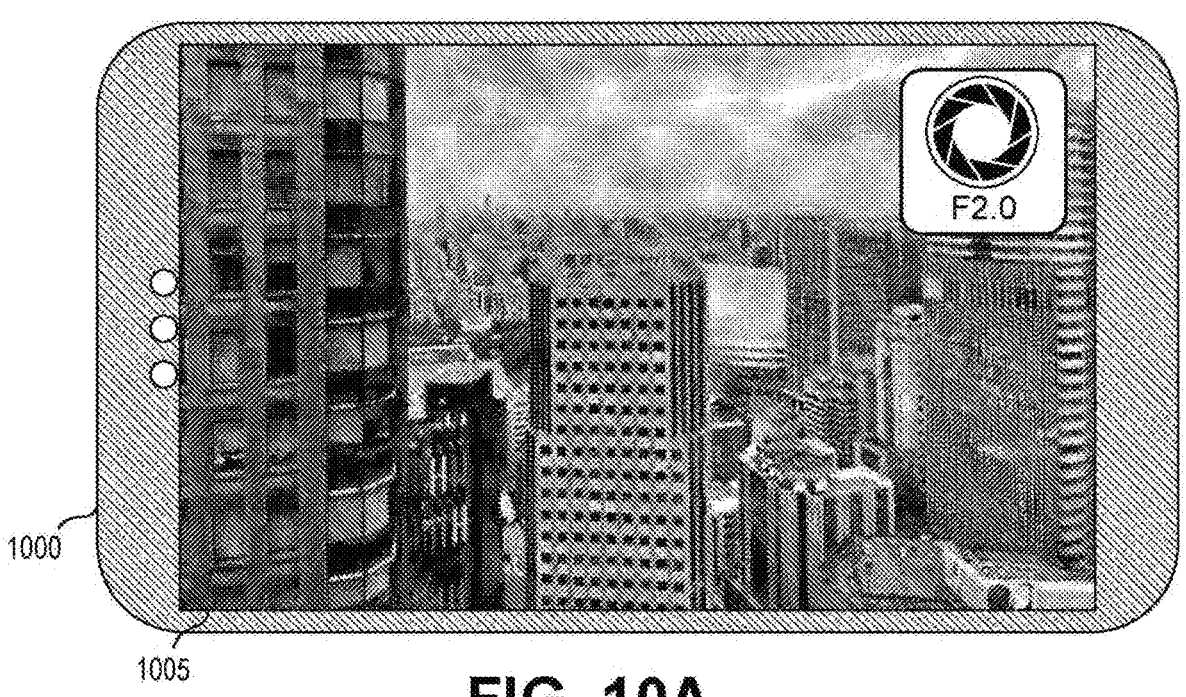
FIGS. 10A-C illustrates operation of a display of an image capture and processing system that displays visual disruptions when an aperture of a lens changes.
Figure 10B:
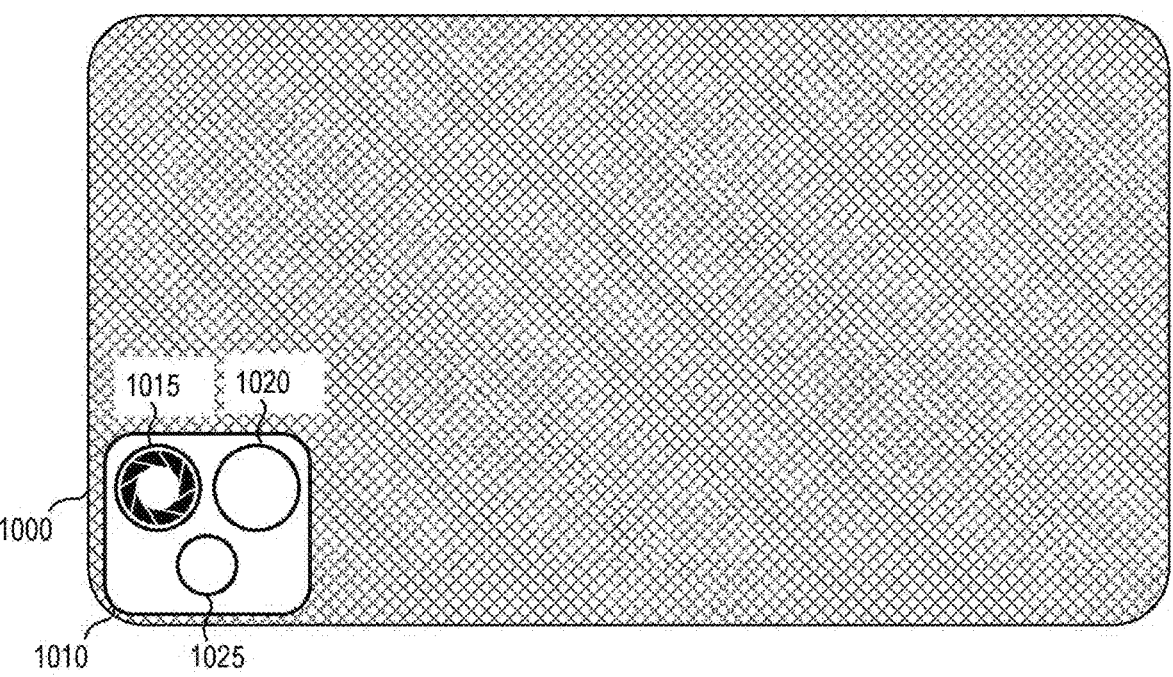
Figure 10C:
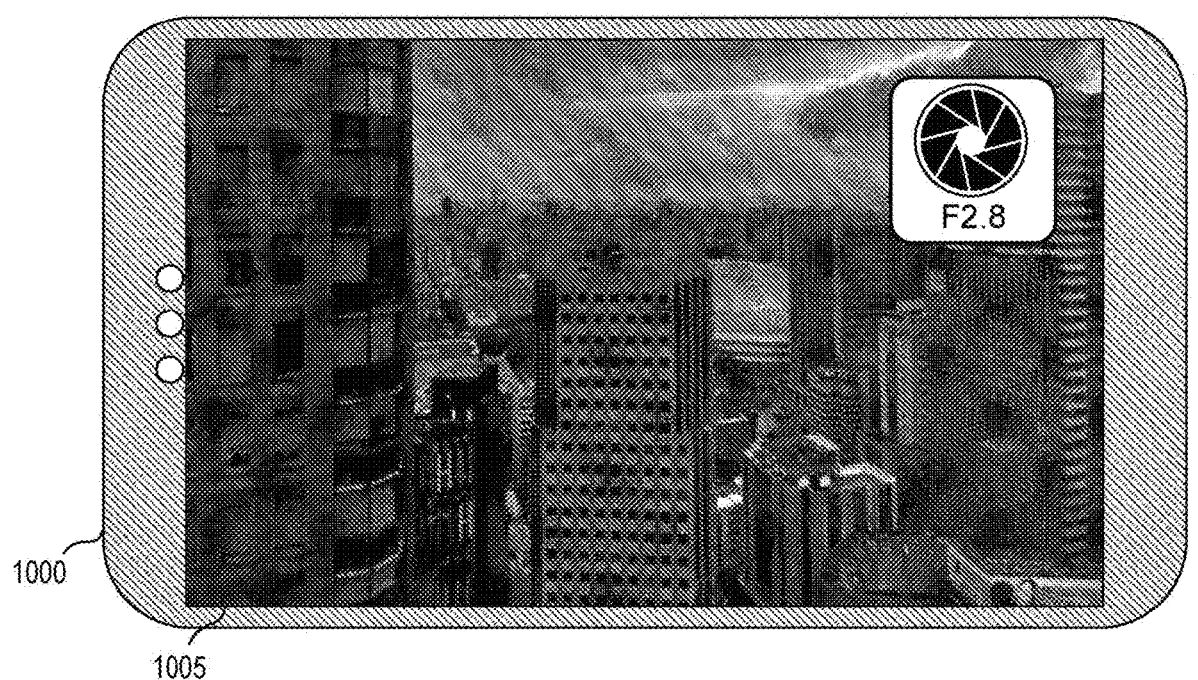

FIGS. 10A-C illustrates operation of a display of an image capture and processing system that displays visual disruptions when an aperture of a lens changes. In some aspects, FIG. 10A illustrates an image capture and processing system that is integrated into a mobile device 1000 and includes a display 1005 displays images on a front side of a mobile device 1000 that are captured by the image capture and processing system.

FIG. 10B illustrates a rear side of the mobile device 1000 includes a lens array 1010 for capturing images using two or more lenses. The lens array 1010 includes a variable aperture lens 1015, a wide-angle lens 1020, and a telephoto lens 1025. The variable aperture lens includes a diaphragm configured to change the aperture and control the focal ratio and described above and illustrated in FIG. 2A-2D. The wide-angle lens 1020 includes a focal length that is smaller than the focal length of a conventional lens for a given plane. In some aspects, the wide-angle lens 1020 has a wider field of view as compared to the variable aperture lens 1015 and allows more of the scene to be included in the captured image. The telephoto lens 1025 has a focal length that is greater than a conventional lens for a given plane and has a narrower field of view than the variable aperture lens 1015 and the wide-angle lens 1020.

In some aspects, the mobile device 1000 uses the variable aperture lens 1015 to capture and present images in the display 1005. For example, the mobile device 1000 may execute an application for scanning a quick response (QR) code and may control the image capture and processing system. As a person moves the mobile device into correct position, the image capture and processing system of the mobile device 1000 may detect that the focal point changes. In response to the focal point changing, the image capture and processing system may change the focal ratio by moving the diaphragm of the variable aperture lens 1015. For example, FIG. 10A illustrates that the variable aperture lens 1015 is presenting images in the display 1005 based on using a focal ratio of F/2.0.

FIG. 10C illustrates that the image capture and processing system changes the focal ratio to F/2.8 by causing the aperture to decrease. As illustrated in FIGS. 2B and 2C, the blades of the diaphragm are physically moved to decrease the size of the aperture and reduce the amount of light received by the variable aperture lens 1015. As a result, the display 1005 may display images that have different optical characteristics such as a darker image illustrated in FIG. 10C, creating observable disruptions (e.g., changes in brightness) that are perceivable by a person.

Moving the blades of the diaphragm to change the aperture takes time and the image capture and processing system may compensate by changing optical characteristics of the image in the display 1005. For instance, the image capture and processing system may perform exposure compensation in order to change the brightness of a particular image during an aperture change. Moving the blades of the diaphragm to change the aperture is a mechanical operation that varies based on external conditions such as temperature, humidity, etc. The movement of the aperture may not match the corresponding image compensation (e.g., exposure compensation), which does not vary based on the external conditions. As a result, the image compensation can overcompensate (e.g., by making the image too bright) or undercompensate (e.g., by making the image too dark) the correction, which results in a visual disruption. Other image compensation methods include discarding the images or deferring to update the display 1005 until the image capture and processing system can present an image without visual disruption.

Figure 11:
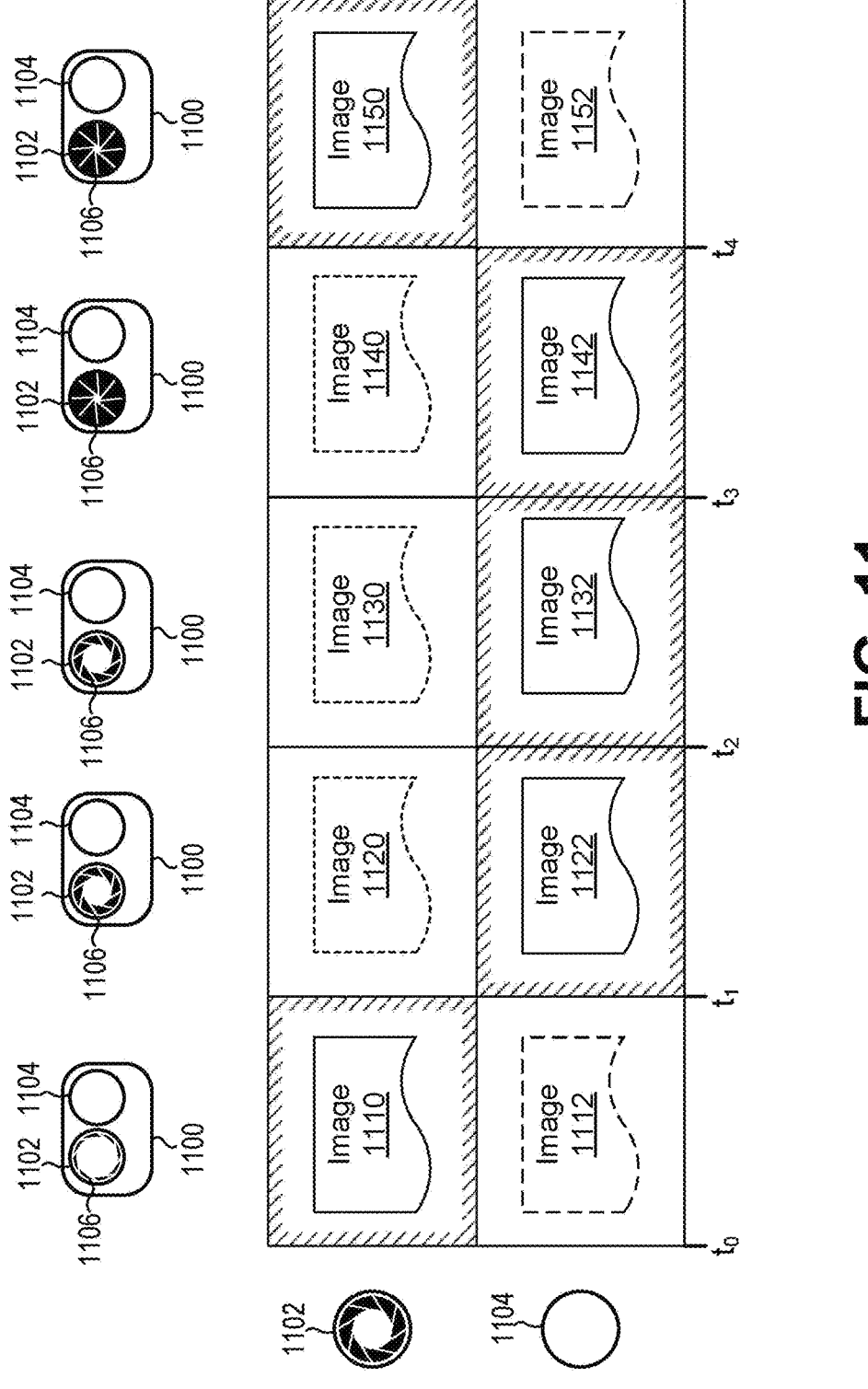
FIG. 11 illustrates a imaging system configured to use multiple lenses that selects and presents images during an aperture change, in accordance with some aspects.

FIG. 11 is a conceptual diagram of a device configured to use multiple lenses to select and present images in accordance with some aspects. In some aspects, the device may include an image capture and processing system to capture images and perform image-based functions such as QR codes, etc. For example, the device, which is not shown for convenience, may include a lens array 1100 having two or more lenses. The lens array 1100 includes a variable aperture lens 1102 and a wide-angle lens 1104 having a field of view that is larger than the variable aperture lens 1102.

At time $t_0$, the device is configured with a lower focal ratio (e.g., F/1.4) and captures and presents an image 1110 from the variable aperture lens 1102 via a display (e.g., display 1005). The image 1112 from the wide-angle lens 1104 may be discarded because it will not be output from the display. FIG. 11 illustrates images displayed by the display are illustrated with an edge hatch (e.g., image 1110, image 1122, image 1132, image 1142, and image 1150).

In some aspects, between time to and time $t_1$, the device determines that the focal point changes and that blades of the diaphragm 1106 need to move to accommodate a higher focal ratio (e.g., F/4.0). For example, the user holding the device orients the device to point to an object far away. In response to this determination, the device controls the lens array 1100 to move the diaphragm 1106 to reduce the aperture size, which reduces light intake in the variable aperture lens 1102 and decreases sensitivity to light. In some cases, the device may initiate movement at a fixed interval such as the beginning of a frame (e.g., $t_0$, $t_1$, etc.) or could initiate movement between frames.

Because the aperture of the variable aperture lens 1102 is changing, the device may be configured to capture and display images from the wide-angle lens 1104. For example, at time $t_1$, the diaphragm is moving and the image 1120 would be darker. If displayed, the darker image 1120 would cause a visual disruption (e.g., an obvious transition from an image with suitable brightness/luminance to a dark image). In general, the display of images in the display should be continuous and smooth (e.g., with consistent brightness or luminance) for an optimal user experience. The device captures and displays image 1122 from the wide-angle lens 1104 in lieu of displaying the image 1120 from the variable aperture lens 1102. In some aspects, an ISP of the device can crop and align the image 1122 to have a corresponding field of view and a corresponding center focal point as the image 1120 because of different physical characteristics and different optical characteristics. For example, the variable aperture lens 1102 and the wide-angle lens 1104 may be planar and therefore may have different center points based on their different physical locations. The wide-angle lens 1104 also captures a larger field of view than the variable aperture lens 1102. An example of cropping and alignment is described below with respect to FIG. 12A and FIG. 12B.

At time $t_2$, the device determines that the diaphragm 1106 is still moving and the device captures and displays image 1132 from the wide-angle lens 1104 in the display in lieu of displaying image 1130 from the variable aperture lens 1102. The device may continue to display images from the wide-angle lens 1104 until one or more conditions associated with the change in the aperture of the variable aperture lens 1102 are met or satisfied. The one or more conditions may include that the aperture of the variable aperture lens 1102 has stopped changing (e.g., the diaphragm 1106 has stopped moving) and settled into a final position based on the final aperture value. Additionally or alternatively, the condition may include that the autoexposure has stabilized (e.g., the images from the variable aperture lens 1102 have optical characteristics that correspond to the image 1110). For instance, referring to FIG. 11 at time t3, the device determines that the diaphragm 1106 is not moving and has stabilized into a final position. The device may then determine whether there has been sufficient light provided to the variable aperture lens 1102. If there is an insufficient amount of light, for example, because the aperture of the variable aperture lens 1102 is significantly smaller because of a higher focal ratio, the device can determine that the image 1140 from the variable aperture lens 1102 is darker than the image 1110. Because the image 1140 is darker than image 1110, the device can display image 1142 from the wide-angle lens 1104 in lieu of the image 1140. At time t4, the device determines that the image 1140 from the variable aperture lens 1102 has received sufficient light exposure and autoexposure has stabilized and causes the display to display image 1150 rather than image 1152.

In some aspects, the device replaces the display of images from the variable aperture lens 1102 with modified (e.g., cropped and aligned) images from the wide-angle lens 1104 while the diaphragm 1106 is moving. As a result, the imaging system displays images from the wide-angle lens 1104 in the display during diaphragm 1106 movement and exposure stabilization, which can allow images with consistent visual characteristics (e.g., brightness or luminance) to be displayed as the variable aperture is changed.

Figure 12A:
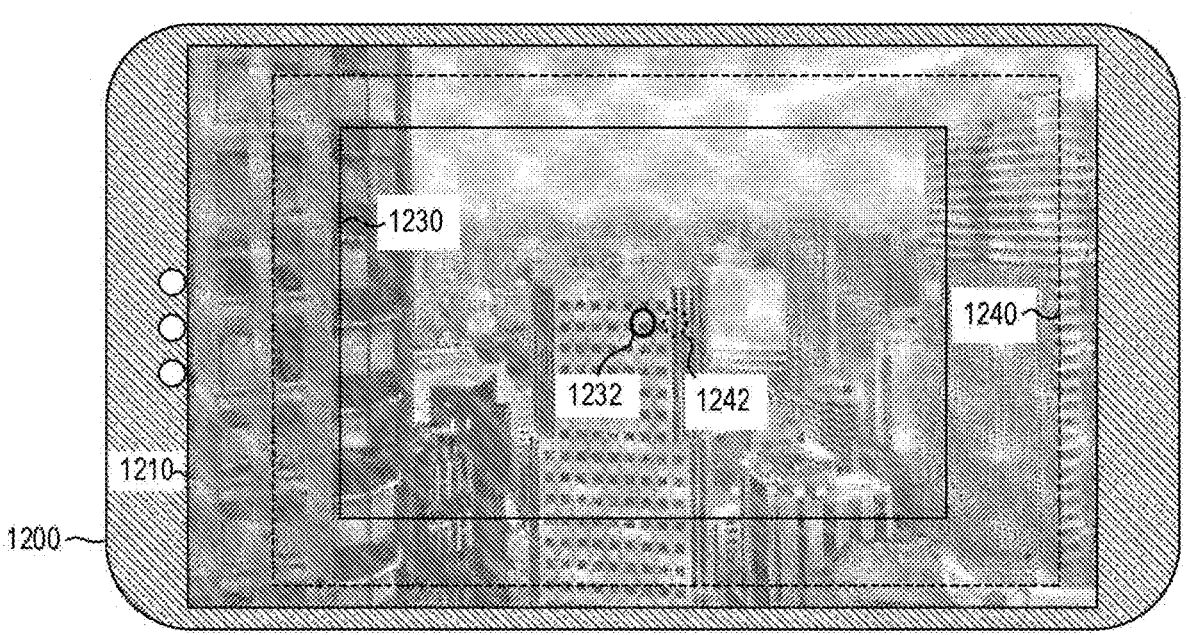
FIGS. 12A and 12B illustrates an example of spatial alignment and transformation (SAT) of an image, in accordance with some aspects.
Figure 12B:
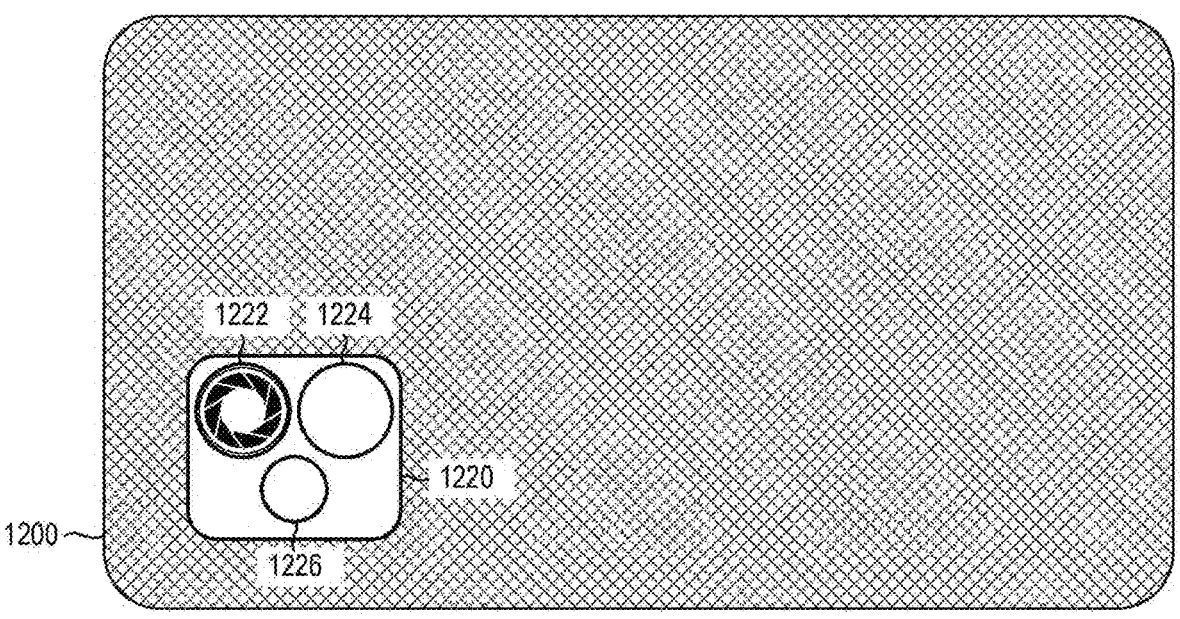

FIGS. 12A and 12B illustrate an example of spatial alignment and transformation (SAT) of an image in accordance with some aspects. In particular, FIG. 12A illustrates a front side of a device 1200 is configured to display an image from a display based on a scene 1210. FIG. 12B illustrates a rear side of the device 1200 and a lens array 1220 having a variable aperture lens 1222, a wide-angle lens 1224, and a telephoto lens 1226. The variable aperture lens 1222, wide-angle lens 1224, and telephoto lens 1226 are all planar and point in parallel directions, but each has a different center point, and a different field of view.

Referring back to FIG. 12A, the variable aperture lens 1222 has a field of view 1230 and with a center point 1232. The wide-angle lens 1224 has a larger field of view 1240 that includes all of the field of view 1230 of the variable aperture lens 1222 and has a center point 1242 that is offset to the right of the center point 1232 of the variable aperture lens 1222. When the rear surface of the device 1200 is pointing the lens array 1220 at the scene 1210, the wide-angle lens 1224 will be positioned to the left of the variable aperture lens 1222. The positioning of the center points is based on the orientation of the device 1200 and may be offset to the left, right, top, or bottom.

In some aspects, the device 1200 is configured to modify the image captured from the wide-angle lens 1224 to correspond to the field of view 1230. For example, the device 1200 may crop the image from the wide-angle lens 1224 to be substantially equal to the field of view 1230 perceived by the variable aperture lens 1222. Other types of correction may be required to reduce effects associated with the different lens, such as correction of some distortion, or other processing needed to make the image from the wide-angle lens 1224 substantially identical to the scene as perceived by the variable aperture lens 1222. In some cases, there could be various differences such as color balance, slight variation in image quality, and so forth, but these effects are minimal as compared to freezing images, dropping images and displaying a black image, substantially darker images.

FIG. 13 is a flowchart illustrating an example of a method 1300 for presenting images by a device in accordance with some aspects. The method 1300 can be performed by a computing device having an image sensor, such as a mobile wireless communication device, a camera, an extended reality (XR) device, a wireless-enabled vehicle, or other computing device. In one illustrative example, an ISP such as the ISP 1400 or a computing system 1500 can be configured to perform all or part of the method 900.

At block 1305, the computing device may display a first set of images captured using a first lens with a first aperture, and the first lens may have a variable aperture. At block 1310 (e.g., while the computing device is configured to display the images (e.g., in a viewfinder), the computing device may initiate a change in aperture of the first lens from the first aperture to a second aperture. For example, the computing device may detect a subject of the focus changes and determine to change a focal ratio based on a position to the subject.

At block 1315, based on initiating the change in the aperture of the first lens, the computing device may capture at least one substitute image using a second lens. In some aspects, the second lens may have a larger field of view than the first lens. For example, the second lens may be a wide-angle lens and include fixed aperture.

At block 1320, the computing device may modify the at least one substitute image to correspond to a field of view associated with the first lens. For example, the computing device may crop a region from the at least one substitute image to correspond to the field of view associated with the first lens. The computing device can spatially align the images to prevent any visual disruptions and ensure continuity in the viewfinder. For example, the center point of the images may be different based on the lens having different locations, and the substitute images may need to be spatially aligned.

At block 1325, the computing device may display the at least one substitute image until a condition associated with the change in the aperture of the first lens is satisfied. For example, the computing device can determine that the variable aperture completed movement from the first aperture to the second aperture. In other aspects, the condition can include an exposure value of the at least one image captured using the first lens with the second aperture being equal to or within a threshold of an exposure value of at least one image from the first set of images. In other cases, the condition may include the variable aperture completing movement from the first aperture to the second aperture and an exposure value of the at least one image captured using the first lens with the second aperture being equal to an exposure value of at least one image from the first set of images.

At block 1330, the computing device may display, based on a determination that the condition is satisfied, at least one image captured using the first lens with the second aperture. In some aspects, the method 1300 provides a continuous viewfinder experience by identifying that the preview images will create visual disruptions and to ensure continuity of the viewfinder, the method provides substitute images from a different lens and the substitute images are displayed in place of the images from the variable aperture lens.

As noted above, the processes described herein (e.g., method/process 900 and 1300, and/or other process described herein) may be performed by a computing device or apparatus. In one example, the method 1300 can be performed by a computing device (e.g., mobile device 102 in FIG. 1) having a computing architecture of the computing system 1500 shown in FIG. 15. The computing device can include any suitable device, such as a mobile device (e.g., a mobile phone), an XR device (e.g., a virtual reality (VR) headset, an augmented reality (AR) headset, AR glasses, a network-connected watch or smartwatch, or other wearable device), a vehicle (e.g., an autonomous, semi-autonomous, or human-driven vehicle) or computing device or system of a vehicle, a desktop computing device, a tablet computing device, a server computer, a robotic device, a television, and/or any other computing device with the resource capabilities to perform the methods described herein, including the method 900 and method 1300. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of methods described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The methods 900 and 1300 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the methods.

The methods 900 and 1300, and/or other method or process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 14:
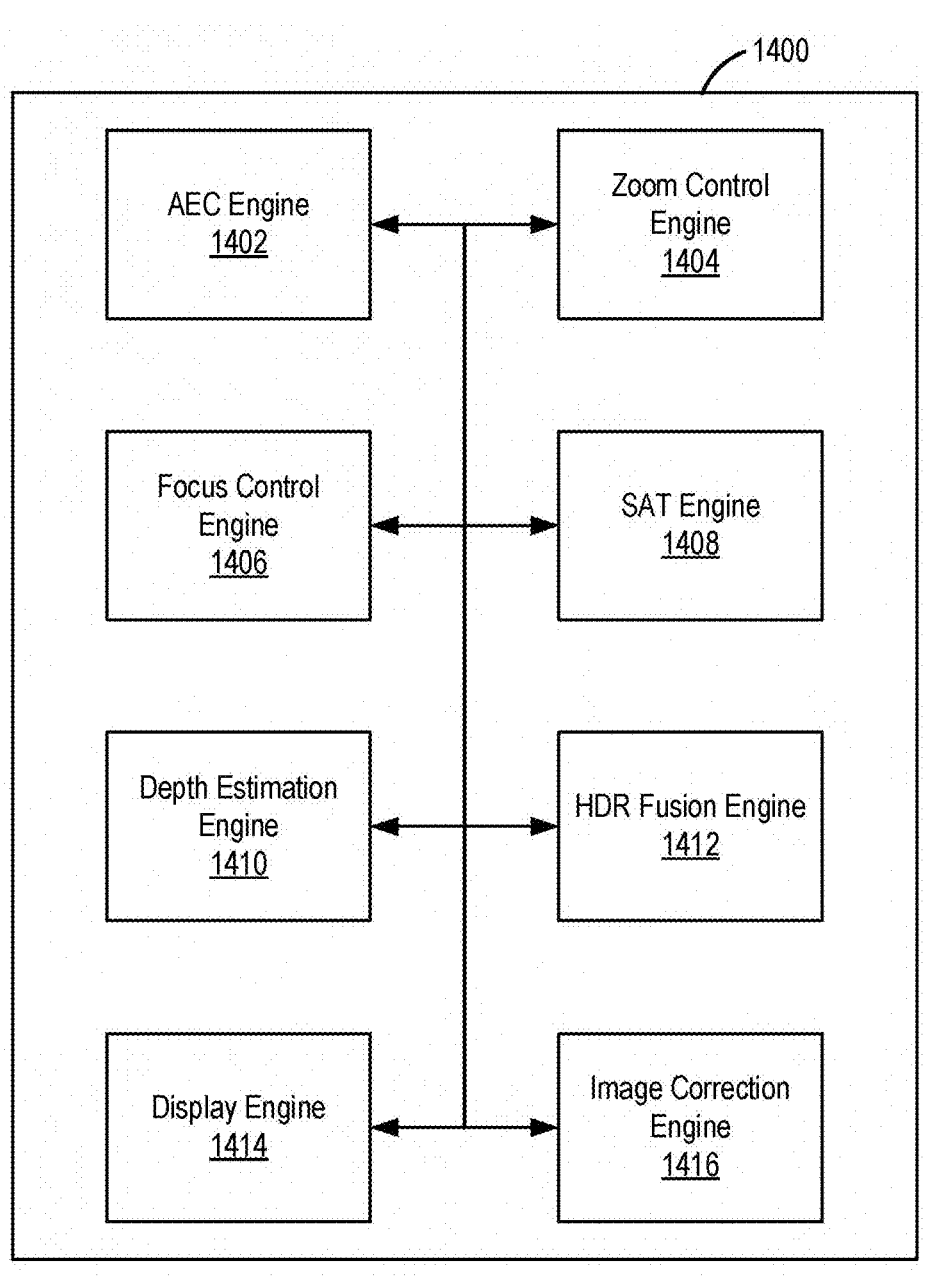
FIG. 14 shows a block diagram of an example image processing device configured to capture HDR images using a dynamic focal ratio and present images from multiple lenses, in accordance with some aspects.

FIG. 14 shows a block diagram of an example image processing device 1400 configured to capture HDR images using a dynamic focal ratio and present images from multiple lenses according to some aspects. In some aspects, the image processing device 1400 is configured to perform one or more of the methods or processes described above. The methods can include the method 900 of FIG. 9 and the method 1300 of FIG. 13, as well as any other process described herein.

The image processing device 1400 may be an example aspect of the image processing device 105B described above with reference to FIG. 1. For example, ISP 1400 can be a chip, system-on-chip (SoC), chipset, package or device that includes a hardware processor, hardware circuitry, programmable circuitry, and/or software engines or modules to perform various functions. The image processing device 1400 may include an AEC engine 1402, a zoom control engine 1404, a focus control engine 1406, a SAT engine 1408, a depth estimation engine 1410, an HDR fusion engine 1412, a display engine 1414, and an image correction engine.

The AEC engine 1402 may be configured to control exposure settings of the lens, such as a focal ratio and an exposure time. The AEC engine 1402 may also control a gain setting that is applied to an image. In some aspects, the AEC engine 1402 may control a diaphragm, such as diaphragm 205 in FIG. 2A-2D, to control the aperture size by causing blades of the diaphragm to move. The AEC engine 1402 can include functions to determine when the diaphragm is finished moving. The AEC engine 1402 can also receive information, such as depth of field, related to a scene and control operation of the lens to capture images based on the depth of field to ensure that the subject and the background content are within focal range. In some cases, the AEC engine 1402 can determine a focal ratio (and corresponding aperture size), an exposure time, and a gain of different images that will be merged into a single HDR image.

The zoom control engine 1404 is configured to perform any optical zoom or digital zoom function. The zoom control engine 1404 may also identify a subject and provide information related to the subject, as well as any zoom information, to the focus control engine 1406. The zoom control engine 1404 is configured to perform electrical or mechanical operations to focus the lens and other processing to change the focal length to correspond to a distance from the image processing device 1400 to a subject identified by the image processing device 1400.

The SAT engine 1408 is configured to perform spatial alignment and transformation of images provided to the image processing device 1400. In some aspects, the SAT engine 1408 can be configured to modify an image provided from a lens, such as a wide-angle lens 1020 in FIG. 10B, to correspond to an image provided from a different lens, such as the variable aperture lens 1015 in FIG. 10B.

The depth estimation engine 1410 is configured to identify a depth in various images captured to the image processing device 1400. For example, the depth estimation engine 1410 is configured to identify a distance to a subject of a scene and identify a distance to background content of that scene. Based on the distance to the subject and the distance to the background content, the depth estimation engine 1410 can determine a depth of field of the scene. In some aspects, and as further described above, the depth estimation engine 1410 can provide information to the AEC engine 1402 to cause the AEC engine 1402 to control capture settings of the lens based on the depth of field associated with a scene.

The HDR fusion engine 1412 is configured to receive at least two images, which have different optical characteristics such as different dynamic ranges and combine the at least two images into a single HDR image.

The display engine 1414 is configured to control a source of images to present on a display, such as display 1005 in FIG. 10A. In some cases, the display engine 1414 can present preview images that are obtained with a variable aperture lens 1015 of FIG. 10B. The display engine 1414 is configured to identify various conditions to may create visual disruptions if an image is displayed. In response to identifying a visual disruption, the display engine 1414 may determine to obtain preview images obtained with another lens, such as the wide-angle lens 1020 of FIG. 10B. In some cases, the display engine 1414 may provide preview images of another lens to the SAT engine 1408 to process the preview image to ensure the display displays similar images to create a smooth, continuous display without any visual disruptions.

The image correction engine 1416 is configured to modify an image to correct and enhance the image. For example, the image correction engine 1416 may be configured to correct for distortion that occurs based on a type of lens, perform various correction measures like enhancing the saturation, and so forth. In some aspects, at least some of the engines 1402, 1404, 1406, 1408, 1410, 1412, 1414, and 1416 are implemented at least in part as software stored in a memory. For example, portions of one or more of the engines 1402, 1404, 1406, 1408, 1410, 1412, 1414, and 1416 can be implemented as non-transitory instructions (or "code") executable by at least one processor to perform the functions or operations of the respective engine. In some cases, at least some of the engines 1402, 1404, 1406, 1408, 1410, 1412, 1414, and 1416 may be implemented by a circuit, such as an ASIC or programmable circuit such as an FPGA. For example the functions associated with the image correction engine 1416 may be implemented in hardware by the ISP 154 in FIG. 1.

Figure 15:
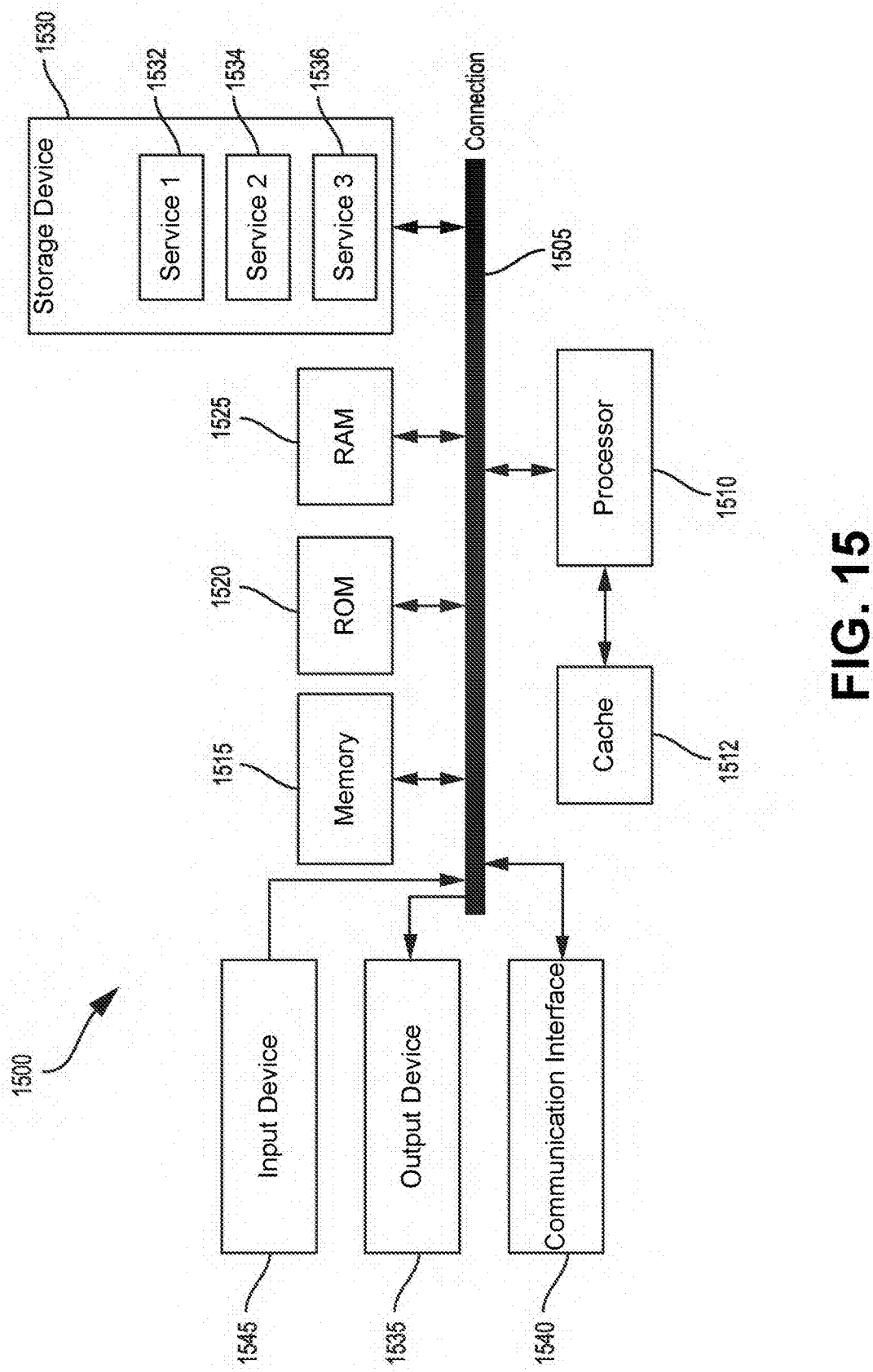
FIG. 15 is a diagram illustrating an example of a system for implementing certain aspects described herein.

FIG. 15 is a diagram illustrating an example of a system for implementing certain aspects of the present technology. In particular, FIG. 15 illustrates an example of computing system 1500, which can be for example any computing device making up internal computing system, a remote computing system, a camera, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some aspects, computing system 1500 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 1500 includes at least one processing unit (CPU or processor) 1510 and connection 1505 that couples various system components including system memory 1515, such as read-only memory (ROM) 1520 and random access memory (RAM) 1525 to processor 1510. Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communications interface 1540, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, wireless local area network (WLAN) signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some aspects, a hardware service that performs a particular function can include the software component stored in a computer-readable medium in connection with the necessary hardware components, such as processor 1510, connection 1505, output device 1535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the IP standard, and/or other types of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as RAM such as synchronous dynamic random access memory (SDRAM), ROM, nonvolatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method of processing image data, comprising: capturing a first image of a subject using a variable aperture lens configured with a first aperture and a first exposure value; capturing a second image of the subject using the variable aperture lens configured with a second aperture and a second exposure value, wherein the second aperture is smaller than the first aperture and the second exposure value is smaller than the first exposure value; and generating an HDR image at least in part by fusing the first image and the second image.

Aspect 2. The method of Aspect 1, further comprising: determining at least one of the first aperture for the first image or the second aperture for the second image at least in part by applying AEC to a previously-captured image.

Aspect 3. The method of Aspect 2, wherein the AEC is used to determine at least one of the first aperture for the first image or the second aperture for the second image based on a depth of field associated with a position of the subject in the previously-captured image and a position of background content in the previously-captured image.

Aspect 4. The method of any of Aspects 1 to 3, further comprising: determining at least one of the first exposure value for the first image or the second exposure value for the second image at least in part by applying AEC to a previously-captured image.

Aspect 5. The method of Aspect 4, wherein the AEC is used to determine at least one of the first exposure value for the first image or the second exposure value for the second image based on an exposure value of the previously-captured image.

Aspect 6. The method of any of Aspects 1 to 5, further comprising: modifying values of pixels in the first image using a gain, the gain increasing the first exposure value of the first image.

Aspect 7. The method of any of Aspects 1 to 6, further comprising: capturing a third image of the subject using the variable aperture lens configured with a third aperture, the third aperture being smaller than the first aperture and greater than the second aperture; wherein the HDR image is generated using the first image, the second image, and the third image.

Aspect 8. A method for presenting images by a device, comprising: displaying a first set of images captured using a first lens with a first aperture, the first lens having a variable aperture; initiating a change in aperture of the first lens from the first aperture to a second aperture; capturing, based on initiating the change in the aperture of the first lens, at least one substitute image using a second lens; modifying the at least one substitute image to correspond to a field of view associated with the first lens; displaying the at least one substitute image until a condition associated with the change in the aperture of the first lens is satisfied; and displaying, based on a determination that the condition is satisfied, at least one image captured using the first lens with the second aperture.

Aspect 9. The method of Aspect 8, wherein the second lens has a larger field of view than the first lens.

Aspect 10. The method of any of Aspects 8 to 9, wherein the second lens has a wide-angle lens and a fixed aperture.

Aspect 11. The method of any of Aspects 8 to 10, wherein modifying the at least one substitute image comprises cropping a region from the at least one substitute image to correspond to the field of view associated with the first lens.

Aspect 12. The method of any of Aspects 8 to 11, wherein the condition includes the variable aperture completing movement from the first aperture to the second aperture.

Aspect 13. The method of any of Aspects 8 to 12, wherein the condition includes an exposure value of the at least one image captured using the first lens with the second aperture being equal to or within a threshold of an exposure value of at least one image from the first set of images.

Aspect 14. The method of any of Aspects 8 to 13, wherein the condition includes the variable aperture completing movement from the first aperture to the second aperture and an exposure value of the at least one image captured using the first lens with the second aperture being equal to an exposure value of at least one image from the first set of images.

Aspect 15: An apparatus comprising at least one memory and at least one processor coupled to the at least one memory, the at least one processor being configured to: capture a first image of a subject using a variable aperture lens configured with a first aperture and a first exposure value; capture a second image of the subject using the variable aperture lens configured with a second aperture and a second exposure value, wherein the second aperture is smaller than the first aperture and the second exposure value is smaller than the first exposure value; and generate an HDR image at least in part by fusing the first image and the second image.

Aspect 16: The apparatus of Aspect 15, wherein the at least one processor is configured to: determine at least one of the first aperture for the first image or the second aperture for the second image at least in part by applying AEC to a previously-captured image.

Aspect 17: The apparatus of any of Aspects 15 to 16, wherein the AEC is used to determine at least one of the first aperture for the first image or the second aperture for the second image based on a depth of field associated with a position of the subject in the previously-captured image and a position of background content in the previously-captured image.

Aspect 18: The apparatus of any of Aspects 15 to 17, wherein the at least one processor is configured to: determine at least one of the first exposure value for the first image or the second exposure value for the second image at least in part by applying AEC to a previously-captured image.

Aspect 19: The apparatus of any of Aspects 15 to 18, wherein the AEC is used to determine at least one of the first exposure value for the first image or the second exposure value for the second image based on an exposure value of the previously-captured image.

Aspect 20: The apparatus of any of Aspects 15 to 19, wherein the at least one processor is configured to: modify values of pixels in the first image using a gain, the gain increasing the first exposure value of the first image.

Aspect 21: The apparatus of any of Aspects 15 to 20, wherein the at least one processor is configured to: capture a third image of the subject using the variable aperture lens configured with a third aperture, the third aperture being smaller than the first aperture and greater than the second aperture, wherein the HDR image is generated using the first image, the second image, and the third image.

Aspect 22: An apparatus comprising at least one memory and at least one processor coupled to the at least one memory, the at least one processor being configured to: output for display a first set of images captured using a first lens with a first aperture, the first lens having a variable aperture; initiate a change in aperture of the first lens from the first aperture to a second aperture; capture, based on initiating the change in the aperture of the first lens, at least one substitute image using a second lens; modify the at least one substitute image to correspond to a field of view associated with the first lens; output for display the at least one substitute image until a condition associated with the change in the aperture of the first lens is satisfied; and output for display, based on a determination that the condition is satisfied, at least one image captured using the first lens with the second aperture.

Aspect 23: The apparatus of Aspect 22, wherein the second lens has a larger field of view than the first lens.

Aspect 24: The apparatus of any of Aspects 22 to 23, wherein the second lens has a wide-angle lens and a fixed aperture.

Aspect 25: The apparatus of any of Aspects 22 to 24, wherein the at least one substitute image is modified by cropping a region from the at least one substitute image to correspond to the field of view associated with the first lens.

Aspect 26: The apparatus of any of Aspects 22 to 25, wherein the condition includes the variable aperture completing movement from the first aperture to the second aperture.

Aspect 27: The apparatus of any of Aspects 22 to 26, wherein the condition includes an exposure value of the at least one image captured using the first lens with the second aperture being equal to or within a threshold of an exposure value of at least one image from the first set of images.

Aspect 28: The apparatus of any of Aspects 22 to 27, wherein the condition includes the variable aperture completing movement from the first aperture to the second aperture and an exposure value of the at least one image captured using the first lens with the second aperture being equal to an exposure value of at least one image from the first set of images.

Aspect 29: A non-transitory computer-readable medium of a network entity having stored thereon instructions that, when executed by one or more processors, cause the one or more processors to perform operations according to any of Aspects 1 to 7.

Aspect 30: An apparatus for wireless communications comprising one or more means for performing operations according to any of Aspects 1 to 7.

Aspect 31: A non-transitory computer-readable medium of a network entity having stored thereon instructions that, when executed by one or more processors, cause the one or more processors to perform operations according to any of Aspects 8 to 14.

Aspect 32: An apparatus for wireless communications comprising one or more means for performing operations according to any of Aspects 8 to 14.

What is claimed is:

1. A method for processing image data, comprising:
displaying a first set of images captured using a first lens with a first aperture, the first lens having a variable aperture;
initiating a change in aperture of the first lens from the first aperture to a second aperture;
capturing, based on initiating the change in the aperture of the first lens, at least one substitute image using a second lens, wherein the first lens is part of a first camera, the second lens is part of a second camera, and the first camera is different from the second camera;
modifying the at least one substitute image to correspond to a field of view associated with the first lens;

displaying the modified at least one substitute image until a condition associated with the change in the aperture of the first lens is satisfied; and displaying, based on a determination that the condition is satisfied, at least one image captured using the first lens with the second aperture.

2. The method of claim 1, wherein the second lens has a larger field of view than the first lens.

3. The method of claim 2, wherein the second lens has a wide-angle lens and a fixed aperture.

4. The method of claim 1, wherein modifying the at least one substitute image comprises cropping a region from the at least one substitute image to correspond to the field of view associated with the first lens.

5. The method of claim 1, wherein the condition includes the variable aperture completing movement from the first aperture to the second aperture.

6. The method of claim 1, wherein the condition includes an exposure value of the at least one image captured using the first lens with the second aperture being equal to or within a threshold of an exposure value of at least one image from the first set of images.

7. The method of claim 1, wherein the condition includes the variable aperture completing movement from the first aperture to the second aperture and an exposure value of the at least one image captured using the first lens with the second aperture being equal to an exposure value of at least one image from the first set of images.

8. An apparatus for processing image data, comprising:

at least one memory; and at least one processor coupled to at least one memory and configured to:

output for display a first set of images captured using a first lens with a first aperture, the first lens having a variable aperture;

initiate a change in aperture of the first lens from the first aperture to a second aperture;

capture, based on initiating the change in the aperture of the first lens, at least one substitute image using a second lens, wherein the first lens is part of a first camera, the second lens is part of a second camera, and the first camera is different from the second camera;

modify the at least one substitute image to correspond to a field of view associated with the first lens;

output for display the modified at least one substitute image until a condition associated with the change in the aperture of the first lens is satisfied; and output for display, based on a determination that the condition is satisfied, at least one image captured using the first lens with the second aperture.

9. The apparatus of claim 8, wherein the second lens has a larger field of view than the first lens.

10. The apparatus of claim 9, wherein the second lens has a wide-angle lens and a fixed aperture.

11. The apparatus of claim 8, wherein the at least one substitute image is modified by cropping a region from the at least one substitute image to correspond to the field of view associated with the first lens.

12. The apparatus of claim 8, wherein the condition includes the variable aperture completing movement from the first aperture to the second aperture.

13. The apparatus of claim 8, wherein the condition includes an exposure value of the at least one image captured using the first lens with the second aperture being equal to or within a threshold of an exposure value of at least one image from the first set of images.

14. The apparatus of claim 8, wherein the condition includes the variable aperture completing movement from the first aperture to the second aperture and an exposure value of the at least one image captured using the first lens with the second aperture being equal to an exposure value of at least one image from the first set of images.

15. A non-transitory computer-readable medium of a network entity having stored thereon instructions that, when executed by one or more processors, cause the one or more processors to:

output for display a first set of images captured using a first lens with a first aperture, the first lens having a variable aperture;

initiate a change in aperture of the first lens from the first aperture to a second aperture;

capture, based on initiating the change in the aperture of the first lens, at least one substitute image using a second lens, wherein the first lens is part of a first camera, the second lens is part of a second camera, and the first camera is different from the second camera;

modify the at least one substitute image to correspond to a field of view associated with the first lens;

output for display the modified at least one substitute image until a condition associated with the change in the aperture of the first lens is satisfied; and output for display, based on a determination that the condition is satisfied, at least one image captured using the first lens with the second aperture.

16. The non-transitory computer-readable medium of claim 15, wherein the second lens has a larger field of view than the first lens.

17. The non-transitory computer-readable medium of claim 16, wherein the second lens has a wide-angle lens and a fixed aperture.

18. The non-transitory computer-readable medium of claim 15, wherein the at least one substitute image is modified by cropping a region from the at least one substitute image to correspond to the field of view associated with the first lens.

19. The non-transitory computer-readable medium of claim 15, wherein the condition includes the variable aperture completing movement from the first aperture to the second aperture.

20. The non-transitory computer-readable medium of claim 15, wherein the condition includes an exposure value of the at least one image captured using the first lens with the second aperture being equal to or within a threshold of an exposure value of at least one image from the first set of images.

21. The non-transitory computer-readable medium of claim 15, wherein the condition includes the variable aperture completing movement from the first aperture to the second aperture and an exposure value of the at least one image captured using the first lens with the second aperture being equal to an exposure value of at least one image from the first set of images.

* * * * *